US012711885B2

(12) United States Patent
Seo et al.

(10) Patent No.: US 12,711,885 B2
(45) Date of Patent: Aug. 18, 2026

(54) ELECTRONIC DEVICE COMPRISING FLEXIBLE DISPLAY, OPERATION METHOD THEREOF, AND NON-TRANSITORY STORAGE MEDIUM

(71) Applicant: Samsung Electronics Co., Ltd., Suwon-si (KR)

(72) Inventors: Youngseung Seo, Suwon-si (KR); Sangheon Kim, Suwon-si (KR); Hyunwoo Kim, Suwon-si (KR); Myoungwoo Nam, Suwon-si (KR); Minjeong Moon, Suwon-si (KR); Taeyong Moon, Suwon-si (KR); Chanpyo Park, Suwon-si (KR); Bona Lee, Suwon-si (KR); Yunsung Choi, Suwon-si (KR); Jiwoo Lee, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/176,923

(22) Filed: Apr. 11, 2025

(65) Prior Publication Data

US 2025/0239195 A1 Jul. 24, 2025

Related U.S. Application Data

(63) Continuation of application No. PCT/KR2023/015598, filed on Oct. 11, 2023.

(30) Foreign Application Priority Data

Oct. 11, 2022 (KR) ........................ 10-2022-0129662
Dec. 2, 2022 (KR) ........................ 10-2022-0167047

(51) Int. Cl.
*G09G 3/00* (2006.01)
*G06F 1/16* (2006.01)
(Continued)

(52) U.S. Cl.
CPC ........... *G09G 3/035* (2020.08); *G06F 1/1652* (2013.01); *G06T 11/00* (2013.01); *H04M 1/0206* (2013.01);
(Continued)

(58) Field of Classification Search
CPC ... G06F 3/04817; G06F 3/0488–04886; G06F 3/0481–04897; G06F 1/165;
(Continued)

(56) References Cited

U.S. PATENT DOCUMENTS

2015/0338888 A1 11/2015 Kim et al.
2016/0132074 A1 5/2016 Kim et al.
(Continued)

FOREIGN PATENT DOCUMENTS

CN 111263005 A 6/2020
EP 4 261 674 A1 10/2023
(Continued)

OTHER PUBLICATIONS

International Search Report dated Jan. 15, 2024, issued in International Application No. PCT/KR2023/015598.
(Continued)

*Primary Examiner* — Hang Lin
(74) *Attorney, Agent, or Firm* — Jefferson IP Law, LLP

(57) ABSTRACT

The disclosure relates to an electronic device including a flexible display, an operation method, and a storage medium. According to an embodiment, an electronic device may control the display module to display a first task bar and respective screens of a plurality of running applications on the first display in an unfolded state of the housing. According to an embodiment, the electronic device may generate at least one icon related to the plurality of applications for continuous use of the plurality of screens based on a partial area of the housing being in a folded state. According to an
(Continued)

embodiment, the electronic device may control the display module to display at least one screen among the plurality of screens and a second task bar including at least one icon on the second display in the folded state. Other embodiments are possible. Other embodiments are also possible.

21 Claims, 21 Drawing Sheets

(51) Int. Cl.
*G06T 11/00* (2006.01)
*H04M 1/02* (2006.01)

(52) U.S. Cl.
CPC ..... *G09G 2340/04* (2013.01); *G09G 2354/00* (2013.01)

(58) Field of Classification Search
CPC ......... G09G 3/03–035; G09G 2340/04; G09G 345/00; G06T 11/00; H04M 1/0206
See application file for complete search history.

(56) References Cited

U.S. PATENT DOCUMENTS

| | | | | |
|---|---|---|---|---|
| 2019/0187758 | A1 | 6/2019 | Lee et al. | |
| 2020/0320906 | A1* | 10/2020 | Knarr | G06F 1/1616 |
| 2020/0326900 | A1 | 10/2020 | Kwon et al. | |
| 2020/0348799 | A1* | 11/2020 | Lin | G06F 3/0481 |
| 2020/0401190 | A1 | 12/2020 | Sim et al. | |
| 2021/0018957 | A1* | 1/2021 | Cho | G06F 1/1641 |
| 2021/0224562 | A1 | 7/2021 | Zhan et al. | |
| 2022/0326816 | A1* | 10/2022 | Walkin | G06F 3/04883 |
| 2023/0015672 | A1 | 1/2023 | Kim et al. | |
| 2023/0146478 | A1 | 5/2023 | You et al. | |
| 2023/0297961 | A1* | 9/2023 | Gupta | G06Q 10/103<br>705/301 |

FOREIGN PATENT DOCUMENTS

| | | | |
|---|---|---|---|
| JP | 2019-087035 | A | 6/2019 |
| KR | 10-2017-0116883 | A | 10/2017 |
| KR | 10-2019-0090982 | A | 8/2019 |
| KR | 10-2020-0119020 | A | 10/2020 |
| KR | 10-2021-0117605 | A | 9/2021 |
| KR | 10-2321293 | B1 | 11/2021 |
| KR | 10-2342555 | B1 | 12/2021 |
| WO | 2022/031049 | A1 | 2/2022 |
| WO | 2022/154500 | A1 | 7/2022 |

OTHER PUBLICATIONS

European Search Report dated Oct. 25, 2024, issued in International Application No. 23782726.6.

* cited by examiner

ELECTRONIC DEVICE COMPRISING FLEXIBLE DISPLAY, OPERATION METHOD THEREOF, AND NON-TRANSITORY STORAGE MEDIUM

CROSS-REFERENCE TO RELATED APPLICATION(S)

This application is a continuation application, claiming priority under 35 U.S.C. § 365(c), of an International application No. PCT/KR2023/015598, filed on Oct. 11, 2023, which is based on and claims the benefit of a Korean patent application number 10-2022-0129662, filed on Oct. 11, 2022, in the Korean Intellectual Property Office, and of a Korean patent application number 10-2022-0167047, filed on Dec. 2, 2022, in the Korean Intellectual Property Office, the disclosure of each of which is incorporated by reference herein in its entirety.

BACKGROUND

1. Field

The disclosure relates to an electronic device including a flexible display and an operation method thereof.

2. Description of Related Art

Electronic devices that include various flexible displays have been developed thanks to the development of electronic technology. Such an electronic device may provide portability while providing a larger display through use of the flexible display. In examples, by the user through applying force to the electronic device, the electronic device may transform a flexible display, which in examples, may be a foldable, bendable, or rollable display.

Use of an electronic device with a larger screen may give the user more convenience in, e.g., web browsing or multimedia playing. A larger display may be adopted to output a larger screen. However, providing such larger displays may be limited by the desired portability of the electronic device. In some examples, a display of the electronic device that uses organic light emitting diodes may secure the portability of the electronic device while providing a larger screen. In some examples, a display using, or equipped with, organic light emitting diodes may implement a stable operation even if it is made quite thin, so that the display may be applied to an electronic device in a foldable, bendable, slidable, or rollable form.

SUMMARY

In conventional electronic devices, when a portion of the housing is folded, a plurality of application screens displayed in the unfolded display are supposed to be used on the shrunken display or an external small display. Thus, it is difficult to make continuous use of multiple windows that simultaneously display the plurality of application screens.

According to an embodiment of the disclosure, there may be provided an electronic device including a flexible display and a method for continuous use of a plurality of screens of a plurality of applications on the electronic device.

According to an embodiment of the disclosure, an electronic device may comprise display circuitry including a first display and a second display, memory storing instructions, and at least one processor including a processing circuit.

According to an embodiment, the instructions, when executed by the at least one processor individually or collectively, cause the electronic device to, based on the electronic device being in an unfolded state, control the display circuitry to display, on the first display, a first task bar and respective screens corresponding to each of a plurality of running applications.

According to an embodiment, the instructions, when executed by the at least one processor individually or collectively, cause the electronic device to generate at least one icon related to the plurality of applications based on the electronic device being changed from the unfolded state to a folded state.

According to an embodiment, the instructions, when executed by the at least one processor individually or collectively, cause the electronic device to, based on the electronic device being in the folded state, control the display module to display, on the second display, at least one screen among the plurality of screens and a second task bar including the generated at least one icon.

According to an embodiment, a method for operating an electronic device may comprise displaying a first task bar and respective screens corresponding to each of a plurality of running applications on a first display of the electronic device based on the electronic device being in an unfolded state.

According to an embodiment, the method may comprise generating at least one icon related to the plurality of applications based on the electronic device being changed from the unfolded state to a folded state.

According to an embodiment, the method may comprise displaying at least one screen among the plurality of screens and a second task bar including the generated at least one icon on a second display of the electronic device based on the electronic device (101) being in the folded state.

According to an embodiment, in non-transitory storage medium storing a program, the program may include instructions configured to, when executed by a processor of an electronic device, cause the electronic device to perform display a first task bar and respective screens of a plurality of running applications on a first display of the electronic device based on the electronic device being in an unfolded state, generate at least one icon related to the plurality of applications for continuous use of the plurality of screens based on the electronic device being changed from the unfolded state to a folded state, and display at least one screen among the plurality of screens and a second task bar including the generated at least one icon on a second display of the electronic device based on the electronic device being in the folded state.

BRIEF DESCRIPTION OF THE DRAWINGS

The same or similar reference denotations may be used to refer to the same or similar elements throughout the specification and the drawings.

DETAILED DESCRIPTION

Various embodiments of the present disclosure are now described with reference to the accompanying drawings. As used herein, the term "user" may denote a human or another device using the electronic device.

Figure 1:
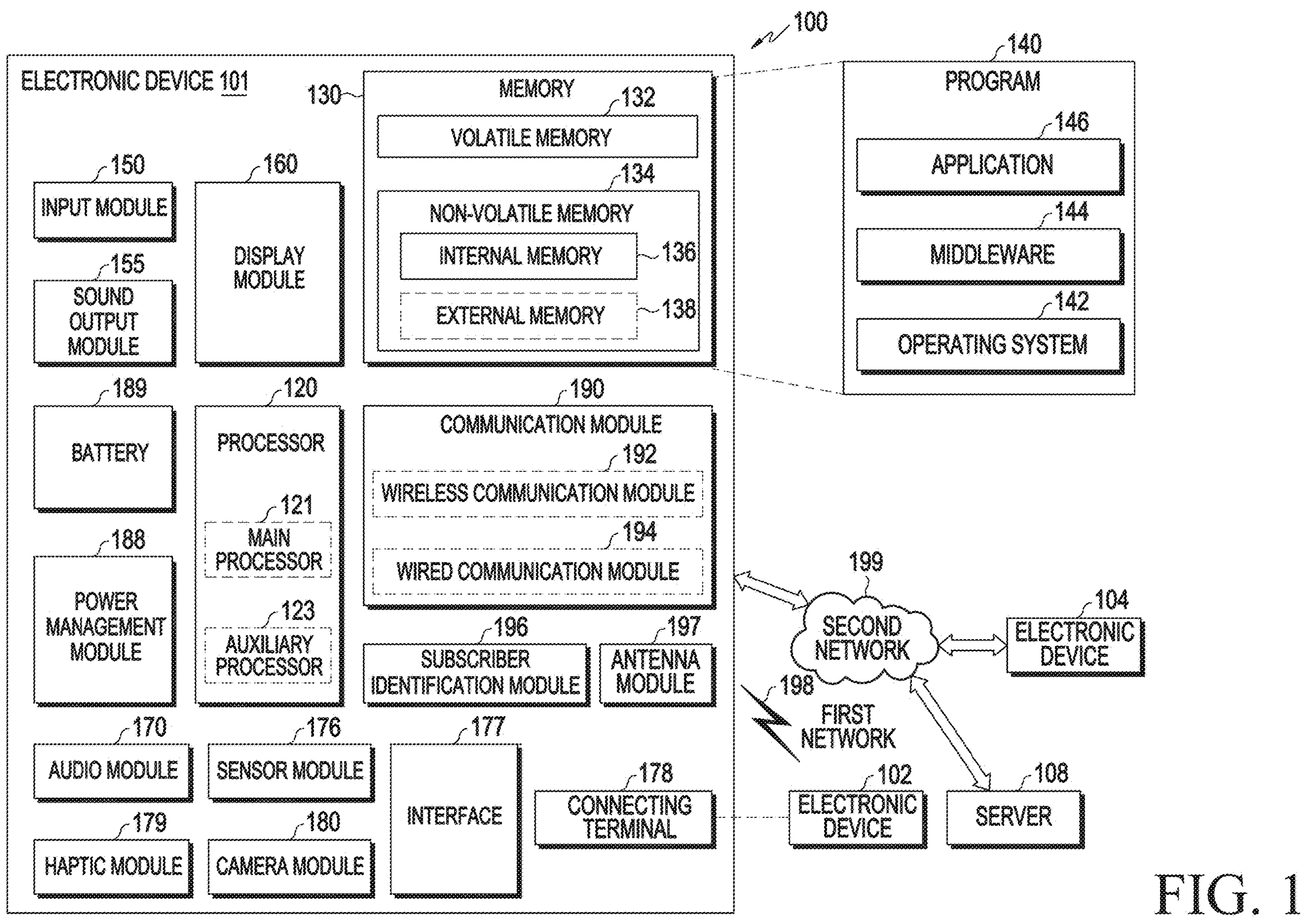
FIG. 1 is a view illustrating an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
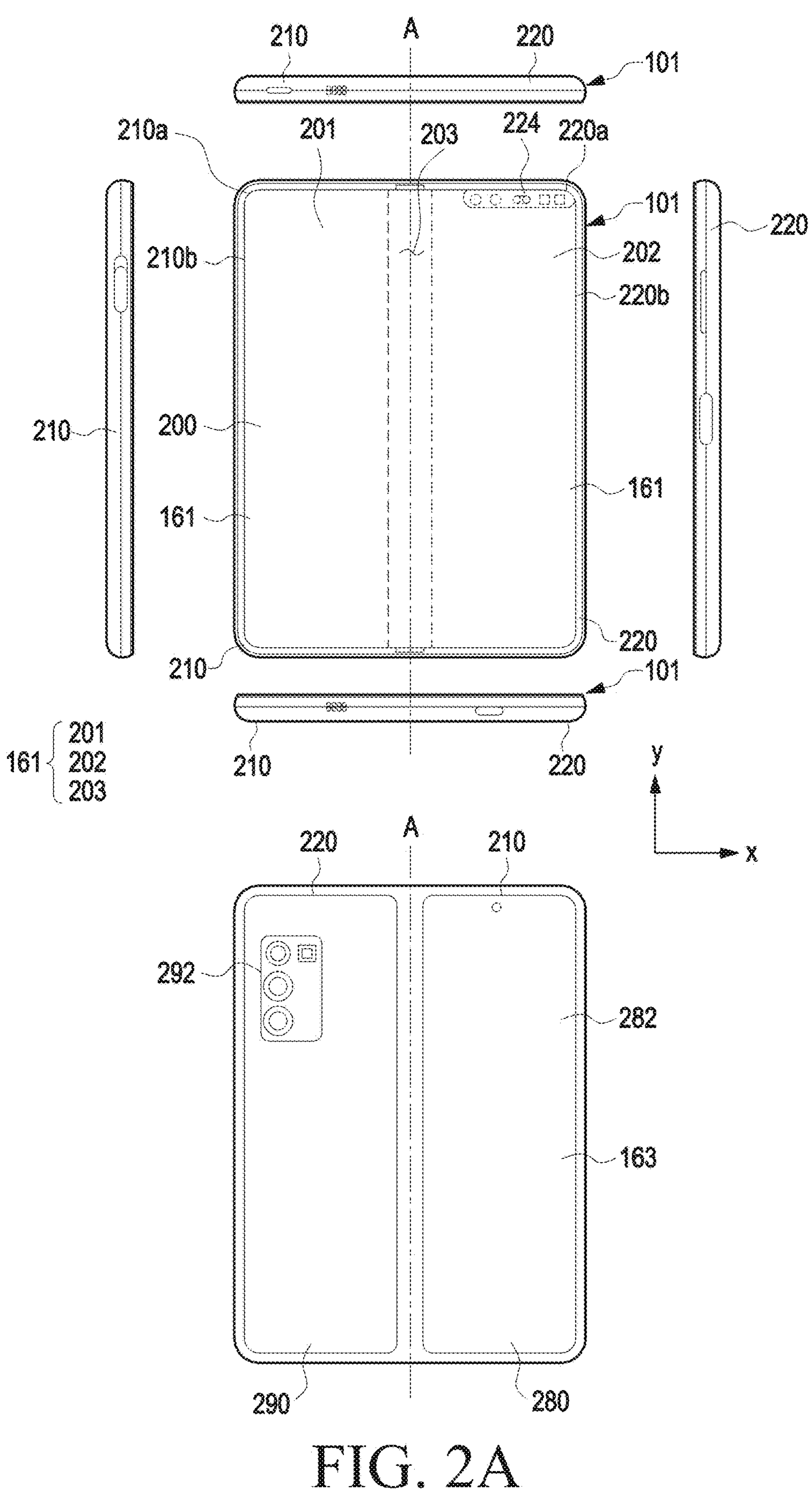
FIGS. 2A and 2B are views illustrating a structure of an electronic device in an unfolded state according to an embodiment.
Figure 2B:
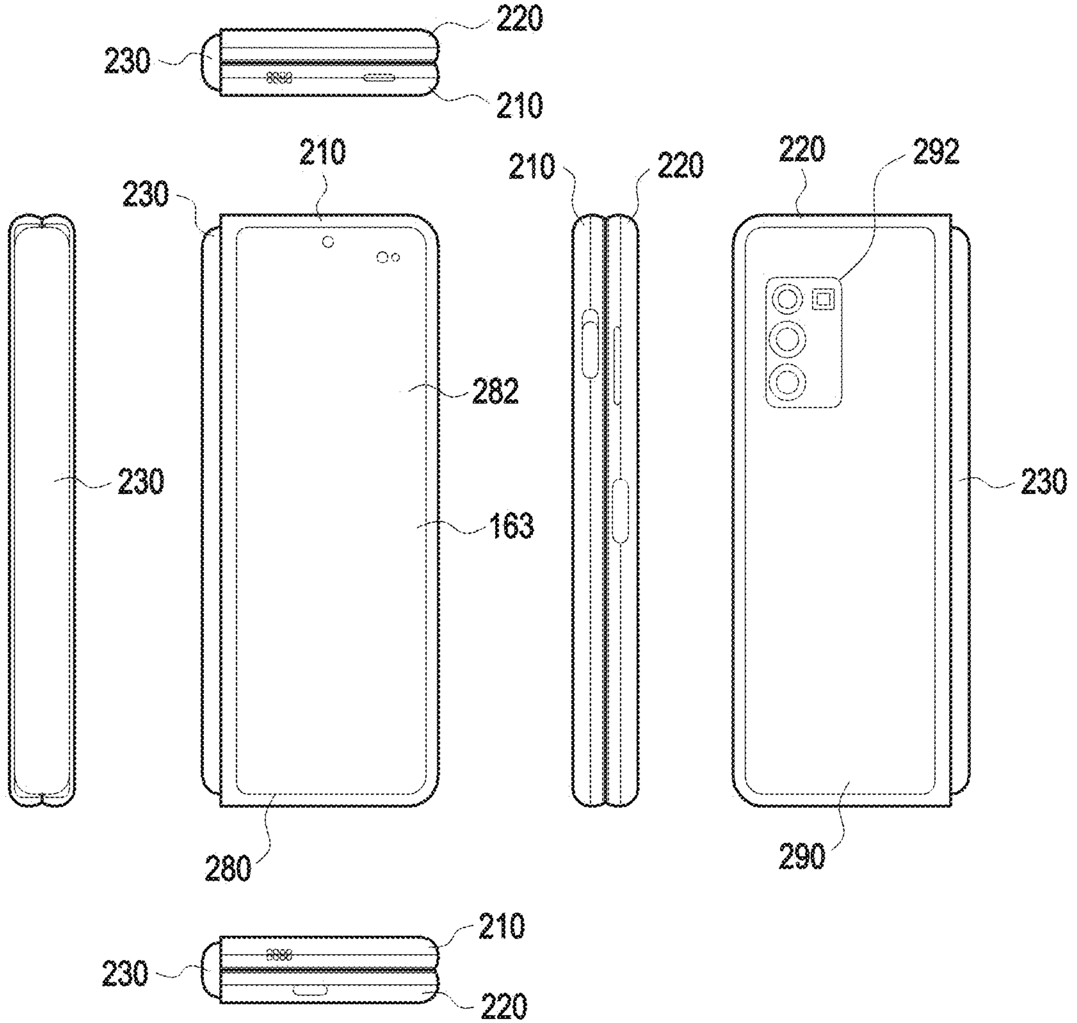
Figure 3A:
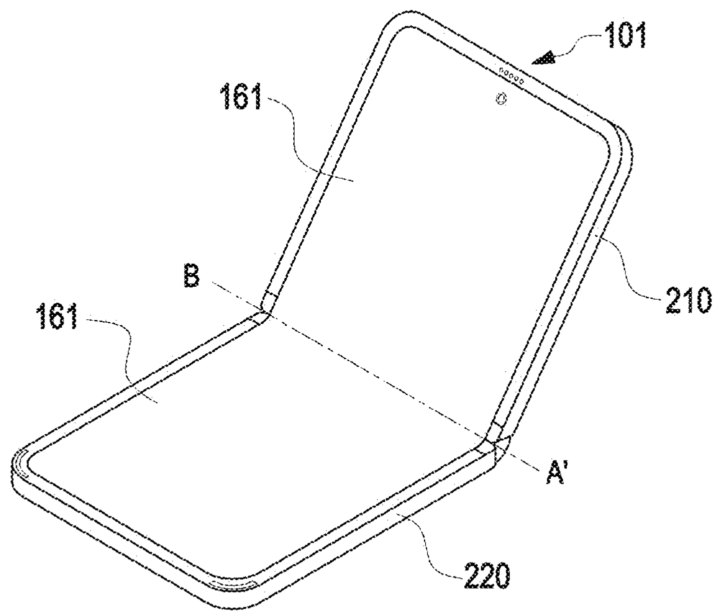
FIGS. 3A and 3B are views illustrating a structure of an electronic device in a folded state according to an embodiment.
Figure 3B:
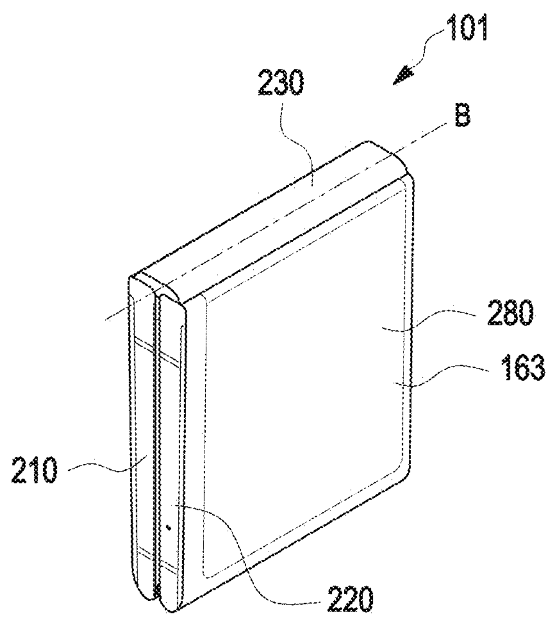

FIGS. 2A and 2B are views illustrating a structure of an electronic device in an unfolded state according to an embodiment. FIGS. 3A and 3B are views illustrating a structure of an electronic device in a folded state according to an embodiment.

Referring to FIGS. 1, 2A, 2B, 3A, and 3B, an electronic device 101 according to an embodiment is a foldable electronic device, and may include a hinge structure (e.g., the hinge structure 230 of FIG. 3) (e.g., a hinge cover) covering a foldable portion of a housing 200, and a first display 161 (e.g., the display module 160 of FIG. 1) in a flexible or foldable form disposed in a space formed by the housing 200. According to an embodiment, the electronic device 101 may include a second display 163 disposed on a portion of the housing 200 on a surface opposite to where the first display 161 is disposed. According to an embodiment, the surface on which the first display 161 is disposed is defined as a first surface (e.g., the front surface) of the electronic device 101. The surface opposite to the first surface is defined as a second surface (e.g., the rear surface) of the electronic device 101. Further, the surface surrounding the space between the first surface and the second surface is defined as a third surface (e.g., side surface) of the electronic device 101. The second display 163 may be smaller in size than the first display 161.

According to an embodiment, the housing 200 may include a first housing structure 210, a second housing structure 220 including a sensor area 224, a first rear cover 280, a second rear cover 290, and a hinge structure 230. The housing 200 of the electronic device 101 are not limited to the shape and coupling shown in FIGS. 2A, 2B, 3A and 3B but may rather be implemented in other shapes or via a combination and/or coupling of other components. For example, the first housing structure 210 and the first rear cover 280 may be integrally formed with each other, and the second housing structure 220 and the second rear cover 290 may be integrally formed with each other.

According to an embodiment, the first housing structure 210 and the second housing structure 220 may be disposed on two opposite sides of a folding axis (e.g., the folding axis A of FIGS. 2A and 2B or the folding axis B of FIGS. 3A and 3B), and may overall have a symmetrical shape with respect to the folding axis A or B. As is described below, the angle or distance between the first housing structure 210 and the second housing structure 220 may be varied depending on whether the electronic device 101 is in the unfolded state, the folded state, or the partially unfolded intermediate state. Wherein, in examples of the disclosure, reference to a folded state and unfolded state of the housing may also correspond to a folded or unfolded state of the electronic device. According to an embodiment, the second housing structure 220 further includes the sensor area 224 where various sensors are disposed, unlike the first housing structure 210 but, in the remaining area, the second housing structure 220 may be symmetrical in shape with the first housing structure 210.

According to an embodiment, the first housing structure 210 and the second housing structure 220 are connected to the hinge structure 230 and may be folded or unfolded as they rotate about the hinge structure 230. Thus, the electronic device 101 may turn into a folded state or unfolded state. The electronic device 101 may change from the unfolded state as illustrated in FIGS. 2A and 3A to the folded state (e.g., the in-folded state of FIGS. 2B and 3B) such that the first surface of the first housing structure 210 and the first surface of the second housing structure 220 approach and face each other. The electronic device 101 may change from the unfolded state as illustrated in FIGS. 2A and 3A to the folded state (e.g., the out-folded state) such that the second surface of the first housing structure 210 and the second surface of the second housing structure 220 approach and face each other.

According to an embodiment, as shown in FIGS. 2A and 3A, the first housing structure 210 and the second housing structure 220 together may form a recess to receive the first display 161. In an embodiment, due to the sensor area 224, the recess may have two or more different widths in the direction perpendicular to the folding axis A. According to an embodiment, the recess may have a first width w1 between a first portion 210*a* of the first housing structure 210, which is parallel with the folding axis A, and a first portion 220*a* of the second housing structure 220, which is formed at an edge of the sensor area 224. The recess may have a second width w2 formed by a second portion 210*b* of the first housing structure 210 and a second portion 220*b* of the second housing structure 220, which does not correspond to the sensor area 224 and is parallel with the folding axis A. In this case, the second width w2 may be longer than the first width w1. As another example, the first portion 210*a* of the first housing structure 210 and the first portion 220*a* of the second housing structure 220, which are asymmetrical with each other, may form the first width w1 of the recess, and the second portion 210*b* of the first housing structure 210 and the second portion 220*b* of the second housing structure 220, which are symmetrical with each other, may form the second width w2 of the recess. According to an embodiment, the first portion 220*a* and second portion 220*b* of the second housing structure 220 may differ in distance from the folding axis A. The width of the recess is not limited thereto. According to another embodiment, the recess may have a plurality of widths due to the shape of the sensor area 224 or the asymmetric portions of the first housing structure 210 and the second housing structure 220.

According to an embodiment, at least a portion of the first housing structure 210 and the second housing structure 220 may be formed of a metal or a non-metal material having a predetermined degree of rigidity to support the first display 161. At least a portion formed of metal may provide a ground plane of the electronic device 101 and may be electrically connected with a ground line formed on the printed circuit board.

According to an embodiment, the sensor area 224 may be formed adjacent to a corner of the second housing 220 and to have a predetermined area. However, the placement, shape, or size of the sensor area 224 is not limited to those illustrated. For example, in another embodiment, the sensor area 224 may be provided in a different corner of the second housing structure 220 or in any area between the top corner and the bottom corner. In an embodiment, components for performing various functions, embedded in the electronic device 101, may be visually exposed through the sensor area 224 or one or more openings in the sensor area 224 to the front surface of the electronic device 101. In various embodiments, the components may include various kinds of sensors. The sensor may include at least one of, e.g., a front-facing camera, a receiver, or a proximity sensor.

According to an embodiment, the first rear cover 280 may be disposed on one side of the folding axis A on the rear surface of the electronic device 101 and have, e.g., a substantially rectangular periphery which may be surrounded by the first housing structure 210. Similarly, the second rear cover 290 may be disposed on the opposite side of the folding axis on the rear surface of the electronic device 101 and its periphery may be surrounded by the second housing structure 220.

According to an embodiment, the first rear cover 280 and the second rear cover 290 may be substantially symmetrical in shape with respect to the folding axis (axis A or B). However, the first rear cover 280 and the second rear cover 290 are not necessarily symmetrical in shape. In another embodiment, the electronic device 101 may include the first rear cover 280 and the second rear cover 290 in various shapes. According to another embodiment, the first rear cover 280 may be integrally formed with the first housing structure 210, and the second rear cover 290 may be integrally formed with the second housing structure 220.

According to an embodiment, the first rear cover 280, the second rear cover 290, the first housing structure 210, and the second housing structure 220 may form a space where various components (e.g., a printed circuit board or battery) of the electronic device 101 may be disposed. According to an embodiment, one or more components may be arranged or visually exposed on/through the rear surface of the electronic device 101. For example, at least a portion of the second display 163 (e.g., a sub display) may be visually exposed through a first rear surface area 282 of the first rear cover 280. In another embodiment, one or more components or sensors may be visually exposed through a second rear surface area 292 of the second rear cover 290. In an embodiment, the sensor may include a proximity sensor and/or a rear camera.

According to an embodiment, a front camera visually exposed to the front surface of the electronic device 101 through one or more openings provided in the sensor area 224, or disposed under the first display 161 without a separate opening, or a rear camera exposed through a second rear surface area 292 of the second rear cover 290 may include one or more lenses, an image sensor, and/or an image signal processor. The flash may include, e.g., a light emitting diode (LED) or a xenon lamp. In an embodiment, two or more lenses (an infrared (IR) camera, a wide-angle lens, and a telephoto lens) and image sensors may be disposed on one surface of the electronic device 101.

Referring to FIGS. 2B and 3B, the hinge structure 230 may be disposed between the first housing structure 210 and the second housing structure 220 to cover internal components. According to an embodiment, the hinge structure 230 may be hidden by a portion of the first housing structure 210 and second housing structure 220 or be exposed to the outside depending on the folding state (e.g., the unfolded state, intermediate state, or folded state) of the electronic device 101. According to an embodiment, as shown in FIGS. 2A and 3A, in the unfolded state of the electronic device 101, the hinge structure 230 may be hidden, and thus not exposed, by the first housing structure 210 and the second housing structure 220. As another example, as shown in FIGS. 2B and 3B, in the folded state (e.g., a fully folded state) of the electronic device 101, the hinge structure 230 may be exposed to the outside between the first housing structure 210 and the second housing structure 220. As another example, in an intermediate state in which the first housing structure 210 and the second housing structure 220 are folded with a certain angle, the hinge structure 230 may be partially exposed to the outside between the first housing structure 210 and the second housing structure 220. In this case, the exposed area may be smaller than when the electronic device 101 is in the fully folded state. According to an embodiment, the hinge structure 230 may include a curved surface.

According to an embodiment, the first display 161 may be disposed on a space formed on the first surface of the first housing structure 210 and the first surface of the second housing 220. According to an embodiment, the second display 163 may be disposed on a space formed on the second surface of the first housing structure 210 or the second surface of the second housing structure 220. For example, the first display 161 may be seated on a recess formed by the housing 200 and may occupy most of the front surface of the electronic device 101. According to an embodiment, the first display 161 may mean a display at least a portion of which may be transformed into a flat or curved surface. According to an embodiment, the first display 161 may include a folding area 203, a first display area 201 disposed in a first housing structure 210 which is one side of the folding area 203 (e.g., the left side of the folding area 203 of FIG. 2A), and a second display area 202 disposed in a second housing structure 220 which is the other side of the folding area 203 (e.g., the right side of the folding area 203 of FIG. 2A).

However, the segmentation of the first display 161 as shown in FIG. 2A is merely an example, and the first display 161 may be divided into a plurality of (e.g., four or more, or two) areas (e.g. display areas) depending on the structure or function. For example, in the embodiment illustrated in FIG. 2A, the first display 161 may be divided into the areas by the folding area 203 or folding axis (A axis) extending in parallel with the y axis but, in another embodiment, the first display 161 may be divided into the areas with respect to another folding area (e.g., a folding area parallel with the x axis) or another folding axis (e.g., a folding axis parallel with the x axis). According to an embodiment, the first display 161 and the second display 163 may be coupled with or disposed adjacent to a touch detection circuit, a pressure sensor capable of measuring the strength (pressure) of touches, and/or a digitizer for detecting a magnetic field-type stylus pen.

According to an embodiment, the first display area 201 and the second display area 202 may be overall symmetrical in shape with respect to the folding area 203. However, unlike the first display area 201, the second display area 202 may include a notch depending on the presence of the sensor area 224, but the rest may be symmetrical in shape with the first display area 201. In other words, the first display area 201 and the second display area 202 may include symmetrical portions and asymmetrical portions.

Described below are the operation of the first housing structure 210 and the second housing structure 220 and each area of the first display 161 depending on the state (e.g., the folded state, unfolded state, or intermediate state) of the electronic device 101.

According to an embodiment, when the electronic device 101 is in the unfolded state (e.g., the unfolded state of FIGS. 2A and 3A), the first housing structure 210 and the second housing structure 220 may be disposed to face in the same direction while being angled at 180 degrees (e.g. substantially 180 degrees) therebetween. The surface of the first display area 201 and the surface of the second display area 202 of the first display 161 may be angled at 180 degrees therebetween while facing in the same direction (e.g., forward of the front surface of the electronic device). The folding area 203 may form the same plane (e.g. substantially the same plane) with the first display area 201 and the second display area 202.

According to an embodiment, when the electronic device 101 is in the folded state (e.g., the folded state of FIGS. 2B and 3B), the first housing structure 210 and the second housing structure 220 may face each other (e.g. may be rotated about hinge structure 230 to face each other). The surface of the first display area 201 and the surface of the second display area 202 of the first display 161 may be angled at a small angle (e.g., an angle between 0 degrees and 10 degrees) therefrom while facing each other. At least a portion of the folding area 203 may be formed as a curve having a predetermined curvature.

According to an embodiment, in the intermediate state of the electronic device 101, the first housing structure 210 and the second housing structure 220 may be arranged at a certain angle therebetween. That is, in some examples, in the intermediate state, the surface of the first display area 201 of the first display 161 and the surface of the second display area 202 may form an angle therebetween which is larger than the angle in the folded state (e.g. an angle between 0 degrees and 10 degrees) and smaller than the angle in the unfolded state (e.g. an angle of substantially, or around, 180 degrees). The folding area 203 may at least partially have a curved surface with a predetermined curvature and, in this case, the curvature may be smaller than that when it is in the folded state.

According to an embodiment, the electronic device 101 may include an in-folding type or an out-folding type. The in-folding type may mean a state in which the flexible first display 161 is not exposed to the outside in the fully folded state. As another example, it may mean a state in which the first display 161 is folded in the front direction. The out-folding type may mean a state in which the first display 161 is visually exposed to the outside in the fully folded state. As another example, it may mean a state in which the first display 161 is folded in the rear direction.

With reference to FIGS. 2A, 2B, 3A, and 3B illustrating the electronic device in the folded state, the fully unfolded state (e.g., when the folding angle of the first display 161 is 180 degrees) of the electronic device 101 and the fully folded state (e.g., when the folding angle of the first display 161 is 0 degrees) are described. However, the electronic device 101 may be folded so that the folding angle of the first display 161 is 0 degrees or more and less than 180 degrees. That is, in some examples, the unfolded state may also refer to a folding angle of about 180 degrees, and a folded state having a folding angle of about 0 degrees.

Figure 4:
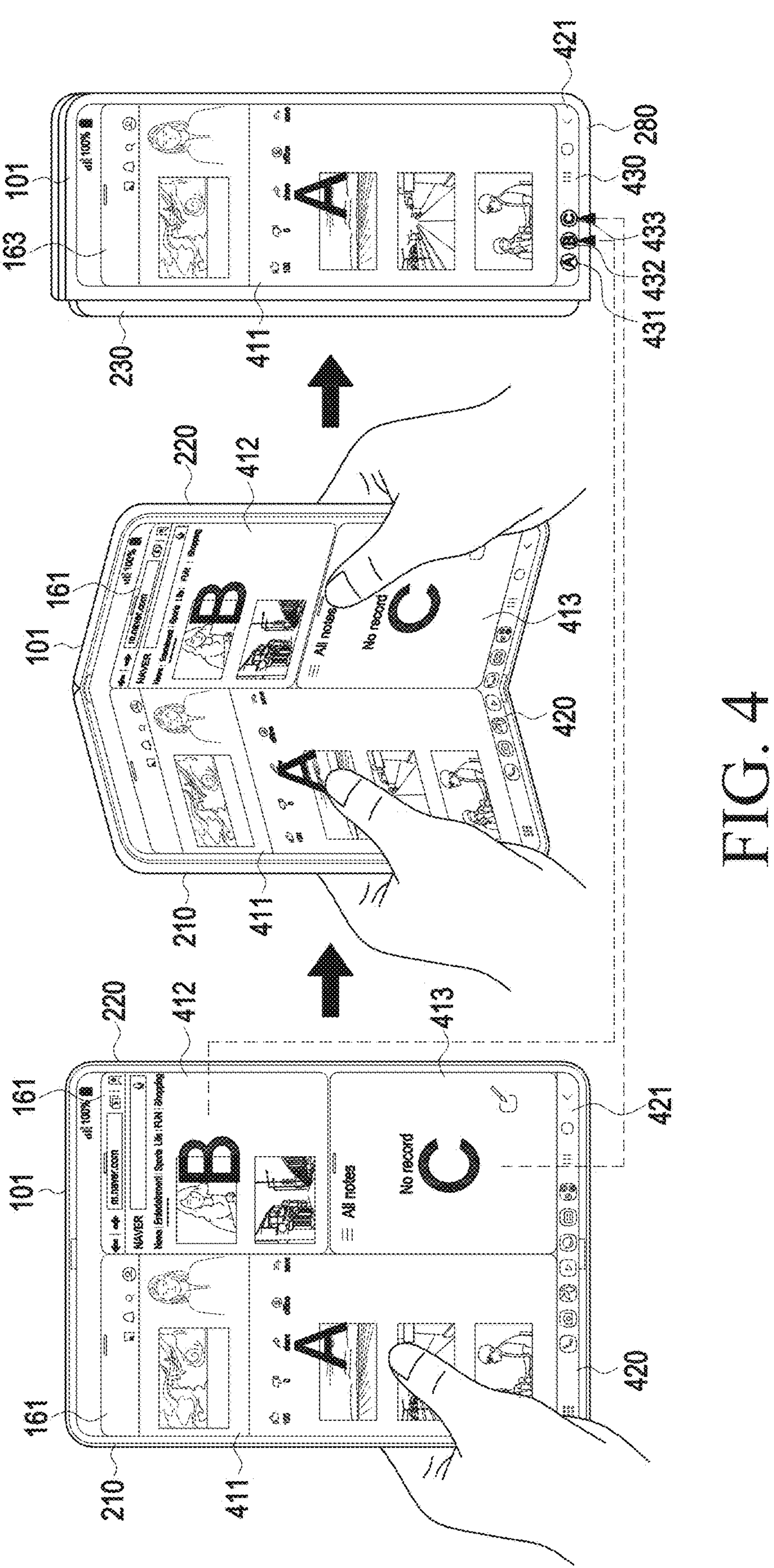
FIG. 4 is a view illustrating a structure of an electronic device in an unfolded state according to an embodiment.

FIG. 4 is a view illustrating a structure of an electronic device in an unfolded state according to an embodiment.

Referring to FIGS. 1 to 4, the electronic device 101 according to an embodiment may include a display module 160 including a first display 161 and a second display 163 and at least one processor 120 electrically connected to the memory 130. According to an embodiment, the at least one processor 120 of the electronic device 101 may execute a plurality of applications in a state in which the housing 200 is unfolded, and may control the display module 160 to display the plurality of screens 411, 412, and 413 for the executed plurality of applications and the first task bar 420 (e.g., a task bar) on the first display 161. The plurality of screens 411, 412, and 413 may be displayed in divided areas of the first display 161 without overlapping each other. The first task bar 420 may be displayed in a partial area (e.g., a lower area) of the first display 161 so as not to overlap the plurality of screens 411, 412, and 413. The first task bar 420 may include an icon of a favorite or frequently used application, an icon of a recently executed application, and/or a designated button (e.g., a menu, an object, icon, or a graphic element). According to an embodiment, the at least one processor 120 may control the display module 160 to display the search bar 421 (e.g., a navigation bar) on the first task bar 420 or to display the search bar 421 in an area adjacent to the first task bar 420 separately from the first task bar 420. The search bar 421 may include at least one of a home, a back, or other system function icons.

According to an embodiment, the at least one processor 120 may hide the first task bar 420 not to be exposed, display the plurality of screens 411, 412, and 413 on the first display 161, and adjust the sizes of the plurality of screens 411, 412, and 413 when receiving a user input (e.g., a designated button input or a designated gesture input) not to overlap the plurality of screens 411, 412, and 413, and may display the first task bar 420 in a partial area (e.g., a lower area) of the first display 161.

According to an embodiment, the at least one processor 120 may identify that the housing 200 is changed to the folded state (e.g., the in-folded state) as the first housing structure 210 and the second housing structure 220 are rotated about a portion (e.g., the hinge structure 230) of the housing 200.

According to an embodiment, the at least one processor 120 may select at least one screen from the plurality of screens 411, 412, and 413 displayed on the first display 161, based on the housing 200 changing from the unfolded state to the folded state. According to an embodiment, when the housing 200 is unfolded or when the housing 200 starts to fold, the at least one processor 120 may select at least one screen from among the plurality of screens 411, 412, and 413, and may display the selected at least one screen on the second display 163. For example, the selected at least one screen may be displayed on the second display 163 not to overlap a second task bar 430 that is displayed in a partial area (e.g. a lower area) of the second display 163. As another example, when the user needs the selected at least one screen, the selected at least one screen may be displayed on the second display 163, temporarily superimposed on the second task bar 430 with the second task bar 430 hidden by the hiding function. For example, the at least one processor 120 may select a screen displayed in a designated (e.g. a pre-designated) main area from among the divided areas of the first display 161, a screen in use just before folding, or a screen for the last executed application (e.g., a recent execution screen) from among the plurality of screens 411, 412, and 413 displayed on the first display 161, a screen selection input by the user (e.g. selection of a screen by user input received to the first display 161) based on a priority and/or a screen selection input by the user. Since the size of the second display 163 is smaller than the size of the first display 161, the at least one processor 120 may select a number of screens smaller than the number of the plurality of screens 411, 412, and 413 displayed on the first display 161.

According to an embodiment, the at least one processor 120 may generate at least one icon (e.g., the first icon 431 ("A"), second icon 432 ("B"), and third icon 433 ("C") of FIG. 4 or at least one icon (e.g., pair icon, or combined icon) combining objects (e.g., images or graphic elements representing a plurality of applications) representing the plurality of applications being executed for continuous use of the plurality of screens 411, 412, and 413 based on the housing 200 changing from the unfolded state to the folded state. Here, the terms of the icons are not limited, and may be replaced with other various terms that may indicate an object, an image, a shortcut icon, a menu, or an application being executed.

According to an embodiment, the at least one processor 120 may set a display attribute of the second task bar 430 (e.g., a task bar) including the generated at least one icon. Here, the display attribute may include at least one attribute among the size, the color, the display position, the number of icons that may be visually exposed, display information (e.g., the size, the display position, or the display order) about the icon to be included, or whether to hide or expose all or at least one included icon of the second task bar 430 by a designated input.

According to an embodiment, the at least one processor 120 may control the display module 160 to display, on the second display 163, the second task bar 430 (e.g., the task bar) including at least one screen (e.g., the first screen 411 ("A")) among the plurality of screens 411, 412, and 413 and at least one generated icon in the folded state. According to an embodiment, the second task bar 430 may include at least one multi-window icon (e.g., at least one of the icons 431, 432, or 433 of FIG. 4) related to a plurality of applications for continuous use of the plurality of screens 411, 412, and 413 without interruption as the housing is changed to the folded state and the execution screen is displayed on another display (the second display 163). The second task bar 430 may include a search bar 421 (e.g., a navigation bar). According to an embodiment, the first task bar 420 may include at least one predesignated icon (e.g., a shortcut icon) and a search bar 421 (e.g., a navigation bar) for quickly starting execution of an application or a designated command. The multi-window icon included in the second task bar 430 may be different from the icon included in the first task bar 420. According to an embodiment, the second task bar 430 may be displayed in a partial area (e.g., a lower area) of the second display 163 not to overlap at least one screen (e.g., the first screen 411 ("A")) or temporarily overlap the at least one screen (e.g., the first screen 411 ("A")) when the hiding function is used. According to an embodiment, the at least one processor 120 may display the second task bar 430 when changing to the folded state while executing the multi-window (e.g., the plurality of screens 411, 412, and 413 of FIG. 4) in the unfolded state and, when receiving an input of a specific key (e.g., home key) in the folded state, stop executing the multi-window when receiving an input of a specific key (e.g., a home key) and change the second task bar 430 to the first task bar 420 to display the first task bar 420. According to an embodiment, when the multi-window is not executed in the unfolded state (e.g., when the normal window rather than the multi-window is executed), the at least one processor 120 may display the first task bar 420 when changing to the folded state.

According to an embodiment, when the first screen 411 is selected from among the plurality of screens 411, 412, and 413, the at least one processor 120 may display the first screen 411 in the application display area of the second display 163, and may display the second task bar 430 including icons generated corresponding to the first screen 411, the second screen 412, and the third screen 413, respectively. That is, the generated icons corresponding to the plurality of screens 411, 412 and 413, which were executed (or being executed) in the first display 161 in the unfolded state, are displayed in the task bar 430 of the second display 163. Here, the icon corresponding to the first screen 411 may be displayed in a different size or color or with a visual effect applied thereto to represent that the icon is displayed in the application display area of the second display 163. That is, the icon corresponding to the selected first screen 411, and executing application, is highlighted, or visually indicated to the user.

According to an embodiment, when the second screen 412 is selected, the at least one processor 120 may display the second screen 412 in the application display area of the second display 163, and may display the icon corresponding to the second screen 412 in a different size or color or with a visual effect applied thereto. According to an embodiment, when the third screen 413 is selected, the at least one processor 120 may display the third screen 413 in the application display area of the second display 163, and may display the icon 433 corresponding to the third screen 413 in a different size or color or with a visual effect applied thereto.

According to an embodiment, even when the housing 200 is changed from the unfolded state to the folded state, the at least one processor 120 may not stop the execution of the plurality of applications that have been executed in the unfolded state, but may continuously maintain the execution of the plurality of applications even in the folded state. Accordingly, the at least one processor 120 may generate icons respectively indicating the plurality of applications that are maintained to be executed, and display the second task bar 430 including the generated icons.

Figure 5:
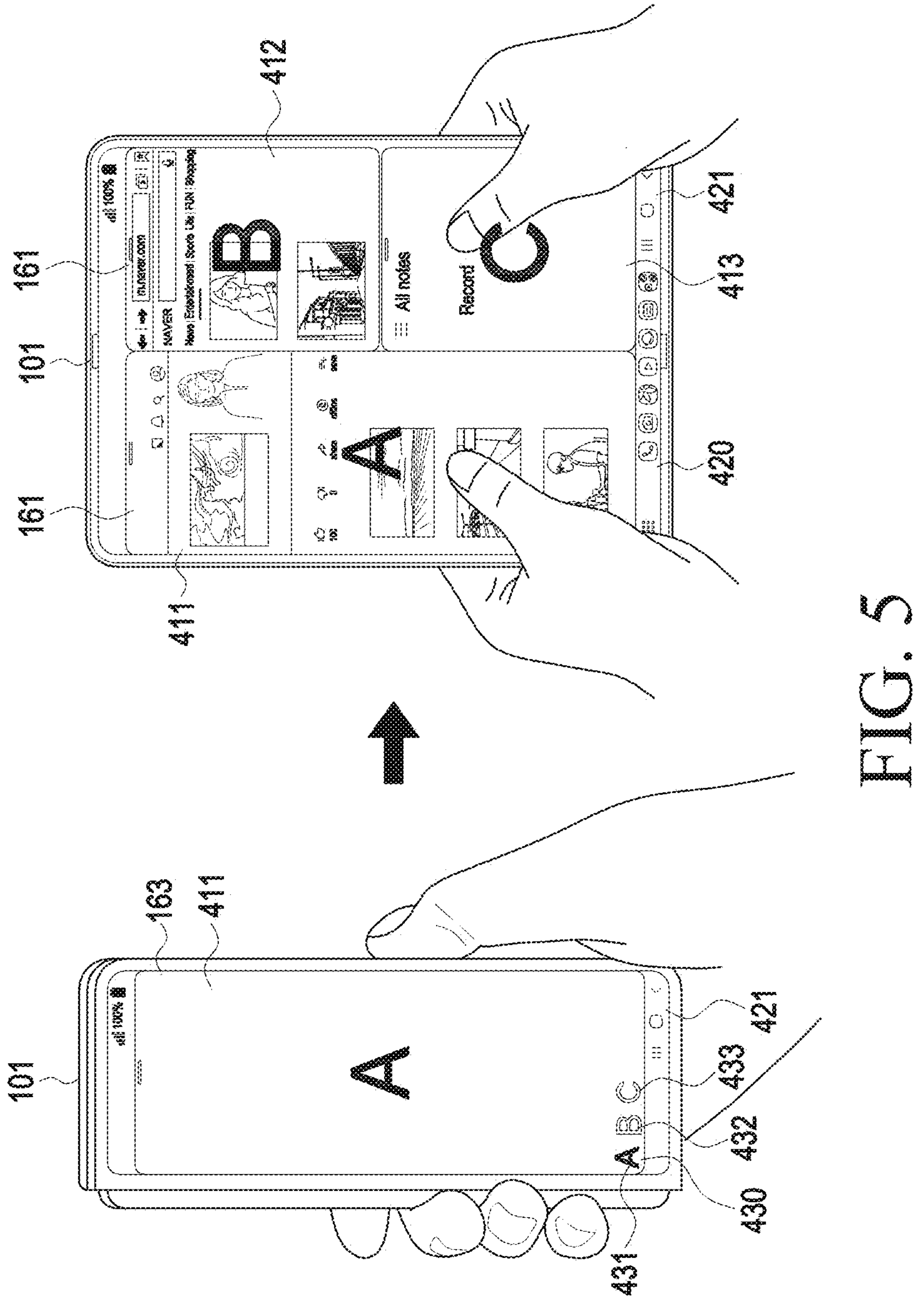
FIG. 5 is a view illustrating a structure of an electronic device in a folded state according to an embodiment.

FIG. 5 is a view illustrating a structure of an electronic device in a folded state according to an embodiment.

Referring to FIGS. 1 to 5, the at least one processor 120 of the electronic device 101 according to an embodiment may identify that the housing 200 is changed to the unfolded state while displaying at least one screen (e.g., the first screen 411 ("A")) and the second task bar 430 on the second display 163 in the folded state. That is, as illustrated in FIG. 5, the electronic device 101 may initially be in the folded state and displaying at least one screen (e.g. a first screen 411 corresponding to application A) in the second display 163, and the second task bar 430. As illustrated in FIG. 5, the second task bar 430 may include a first icon A 431 indicating a first screen 411 ("A") of a first application displayed on the second display 163, and a second icon B 432 and a third icon 433 respectively indicating a second application and a third application that are not displayed on the second display 163 and are running in the background. According to an embodiment, based on changing from the folded state to the unfolded state, the at least one processor 120 may continuously maintain execution of the plurality of applications that have been executed in the folded state, and may display the plurality of screens 411, 412, and 413 for the plurality of running applications in the divided areas, respectively, of the first display 161. The at least one processor 120 may display the first task bar 420 in a partial area (e.g., a lower area) of the first display 161 so as not to overlap the plurality of screens 411, 412, and 413. Here, the plurality of running applications A, B, and C displayed on the first display 161 in the unfolded state may be the same as applications A, B, and C indicated by the icons 431, 432, and 433 included in the second task bar 430 of the second display 163. In some examples, when a plurality of running applications are displayed on the second display 163, the plurality of running applications displayed in the folded state and some applications displayed in the unfolded state may be different from each other. In some examples, some of the screens (e.g. of the running applications) displayed on the first display 161 may be different from some of the screens displayed on the second display 163.

According to an embodiment, when a new application is executed in the folded state, the at least one processor 120 may maintain execution of the new application even when changing to the unfolded state, and may display a screen for the new application in a designated split area on the first display 161. According to an embodiment, when the new application is executed in the folded state, the at least one processor 120 may add a new icon corresponding to the new application to the second task bar 430 displayed on the second display 163 in the folded state. According to an embodiment, when a new application different from the applications being executed in the multi-window is executed and a first touch input (e.g., a touch input not related to the multi-window, for example, a touch input outside of the multi-window) is received, the at least one processor 120 may stop execution of the multi-window, and control to display a screen corresponding to the new application alone, and display the first task bar 420 on the second display 163. According to an embodiment, when a new application different from the applications being executed in the multi-window is executed and a second touch input (e.g., a drag-and-drop touch input) related to the multi-window is received, the at least one processor 120 may maintain the execution of the multi-window, display the currently displayed screen and the screen corresponding to the new application in the divided areas of the second display 163, and may display the second task bar 430. The at least one processor 120 may add a new icon for the new application to the second task bar 430.

According to an embodiment, when execution of at least one of the applications executing is terminated in the folded state, the at least one processor 120 may not display the screen of the terminated application on the first display when changing to the unfolded state. According to an embodiment, when execution of some applications is terminated in the folded state, the at least one processor 120 may remove the icon for the terminated application from the second task bar 430 displayed on the second display 163 in the folded state.

According to an embodiment, the at least one processor 120 may be changed from the folded state to the unfolded state, and may turn off the second display 163 when the housing 200 is in the fully unfolded state. According to an embodiment, when the housing 200 is unfolded to the intermediate state, the at least one processor 120 may apply and display a visual effect such that the screens displayed on the second display 163 gradually disappear, and may apply and display a visual effect such that the plurality of screens 411, 412, and 413 for the plurality of applications A, B, and C running on the first display 161 gradually appear. According to an embodiment, the at least one processor 120 may turn off the second display 163 when the screens 411, 412, and 413 displayed on the second display 163 completely disappear. According to an embodiment, the at least one processor 120 may be changed from the folded state to the unfolded state, and may turn off the second display 163 when the housing 200 is in the fully unfolded state. According to an embodiment, the at least one processor 120 may stop displaying the at least one screen (e.g., the first screen 411) and the second task bar 430 displayed on the second display 163 without turning off the second display 163, and may display a menu or screen (e.g., a clock) according to a designated function or command on the second display 163.

According to an embodiment, when the first housing structure 210 and the second housing structure 220 are unfolded again at a designated angle (e.g. folding angle) or more in the folded state, the at least one processor 120 may change the first display 161 to the on state.

According to an embodiment, when the first housing structure 210 and the second housing structure 220 are in the out-folded state with respect to the folding axis (A in FIG. 2A or B in FIG. 3A) and only one of the first display area 201 or the second display area 202 of the first display 161 is in the on state, the at least one processor 120 may display at least one screen selected from the plurality of screens, as in the operation method in the folded state by in-folding. In this case, the at least one processor 120 may display the second task bar 430, generate icons 431, 432, and 433 indicating a plurality of applications for continuous use of the plurality of screens, and add the icons 431, 432, and 433 to the second task bar 430.

According to an embodiment, when the user's designated gesture input (e.g., a selection input of a shortcut icon included in an edge screen) is received in a partial area (e.g., an edge handle) of the housing 200, the at least one processor 120 may execute a new application (e.g., a fourth application) and may display a screen (hereinafter, referred to as a fourth screen) for the executed new application on the second display 163. The at least one processor 120 may divide the application display area of the second display 163, reduce the size of the first screen 411 to the size of one divided area, and may display a fourth screen (not shown) in the other divided area. The electronic device 101 may generate a new icon (not shown) for the new application and may display the generated new icon on the second task bar 430.

According to an embodiment, when changing from the folded state to the unfolded state, the at least one processor 120 may display the first screen 411 and the fourth screen (e.g., 1211 of FIG. 12) displayed on the second display 163 on the first display 161, and may display at least one of the remaining second application B and the third application on the first display 161. For example, when the application display area of the first display 161 is divided into three display areas, an application having a higher priority according to use, of the second application B and the third application C, may be displayed, and the running application for which the screen is not displayed may generate an icon indicating that the application is being executed and may add the icon to the first task bar 420 or may display an object indicating the running application where the screen is not displayed in a partial area of the first display 161. By selecting such an object, one of the displayed screens may be hidden, and the screen of the running application where the screen is not displayed may be displayed on the first display 161.

According to an embodiment, when the user's designated gesture input (e.g., a selection input of a shortcut icon included in an edge screen) is additionally received in a partial area (e.g., an edge handle) of the housing 200, the at least one processor 120 may execute a new application (hereinafter, referred to as a fifth application) and may display a screen (hereinafter, referred to as a fifth screen) for the executed new fifth application on the second display 163. According to an embodiment, the at least one processor 120 may display the fifth screen in place of the first screen 411 displayed at the position (e.g., an upper divided area) indicated by the user's gesture input in the divided areas of the second display 163. According to an embodiment, the at least one processor 120 may generate a new icon (not shown) for the new fifth application and may display the generated new icon on the second task bar 430. The electronic device 101 may generate at least one pair icon (e.g., at least one of AB, AC, or BC) indicating a combination of the first application A, the second application B, and the third application C, the screens of which are not displayed on the second display 163, and may add the generated pair icon to the second task bar 430. According to an embodiment, the at least one processor 120 may generate a pair icon indicating a combination of the new fourth application and fifth application, and may add the generated pair icon to the second task bar 430.

According to an embodiment, when a gesture input (e.g., a two-finger gesture input) or a designated button input (e.g., an action inducer button input) is received, the electronic device 101 may change the screen (e.g., the second screen 412) displayed in an application area of the second display 163 to the screen (e.g., the first screen 411 or the third screen 413) of another application being executed.

According to an embodiment, the at least one processor 120 may control the display module 160 to hide the second task bar 430 or may hide icons indicating applications running on the second task bar 430 not to be exposed and to add a designated button (e.g., an action inducer button) and display the second task bar 430.

According to an embodiment, when a designated button input is received, the at least one processor 120 may control the display module 160 to display an extension task bar including icons indicating running applications. When an input for selecting an icon (e.g., the second icon) selected from the extension task bar is received, the electronic device 101 may display the second screen 412 of the second application B corresponding to the selected second icon, in place of the first screen 411 of the first application A displayed in the application display area of the second display 163.

According to an embodiment, when receiving a first input of the designated button, the at least one processor 120 may display the second screen 412 of the second application B corresponding to the second icon on the second display 163 in place of the first screen 411 of the first application A. According to an embodiment, when receiving a second input of the designated button, the at least one processor 120 may divide the application display area of the second display 163, and may display the first screen 411 of the first application A and the second screen 412 of the second application B corresponding to the second icon in the divided areas, respectively. According to an embodiment, when receiving a third input of the designated button, the at least one processor 120 may stop displaying the second screen 412 on the second display 163, may merge the divided application display areas, and may enlarge the first screen 411 to display the enlarged first screen 411 on the entire application display area.

Figure 6A:
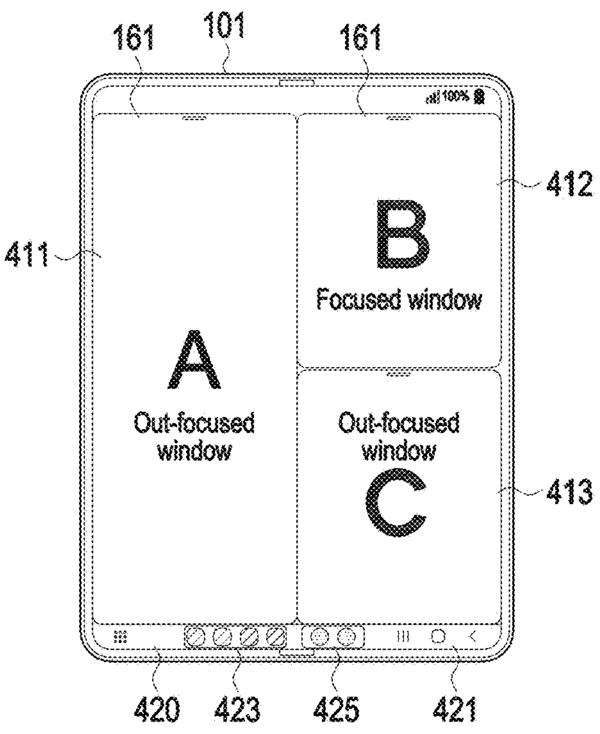
FIGS. 6A, 6B, and 6C are views illustrating a structure of an electronic device in a folded state according to an embodiment.
Figure 6B:
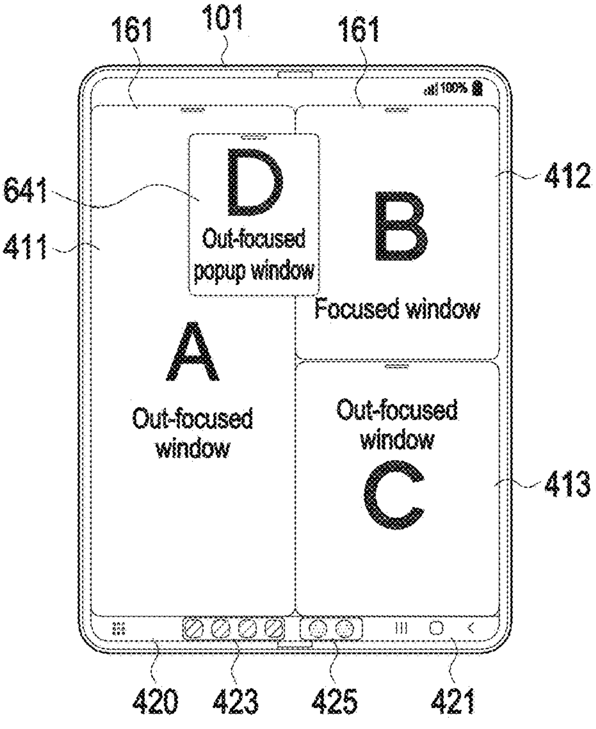
Figure 6C:
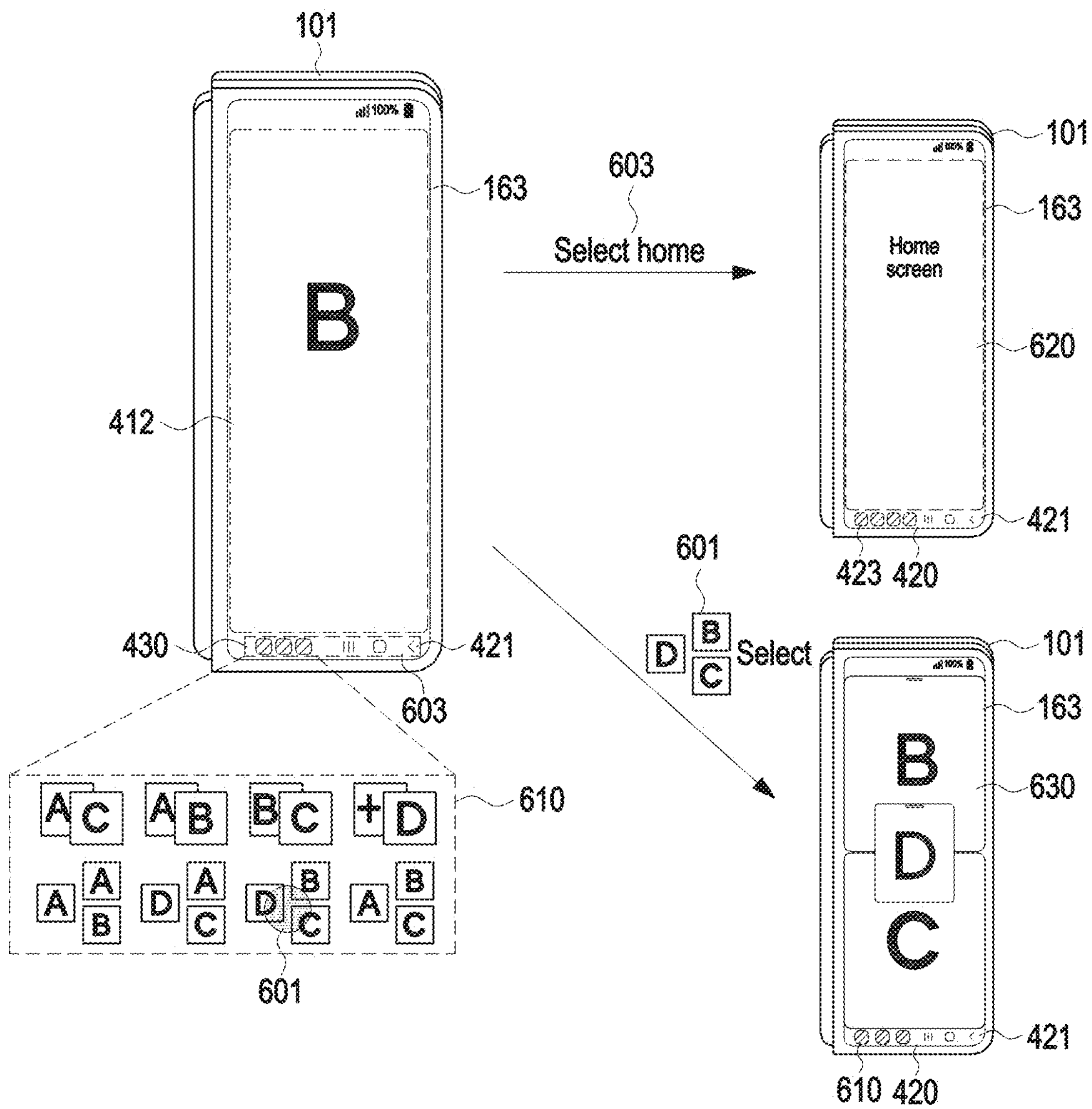

FIGS. 6A, 6B, and 6C are views illustrating a structure of an electronic device in a folded state according to an embodiment.

Referring to FIGS. 1, 2A, 2B, 3A, 3B, 6A, 6B, and 6C, the at least one processor 120 according to an embodiment may display, on the display 161, a multi-window including a plurality of screens (e.g., an non-focused window 411 of first application A, an focused window 412 of second application B, and an non-focused window 413 of third application C) in the unfolded state as shown in FIG. 6A. As shown in FIG. 6B, in the unfolded state, the at least one processor 120 according to an embodiment may display a popup window (e.g., the non-focused popup window 641 of fourth application D) on the display 161, overlapping the multi-window including the plurality of screens (e.g., the non-focused window 411 of first application A, the focused window 412 of second application B, and the non-focused window 413 of third application C).

According to an embodiment, the at least one processor 120 may select (e.g., focus) the second screen 412 of second application B among the plurality of applications (e.g., the applications A, B, and C of FIG. 6A or the applications A, B, C, and D of FIG. 6B) displayed on the first display 161 in the unfolded state. Upon identifying changing to the folded state, the at least one processor 120 may generate pair icons 610 (e.g., AB, BC, AC, +D, ABD, ACD, BCD, and/or ABC of FIG. 6) by combining two or more objects respectively representing a plurality of applications (e.g., the applications A, B, and C of FIG. 6A or the applications A, B, C, and D of FIG. 6B). For example, the at least one processor 120 may generate a pair icon AC indicating a combination of first application A and third application C, a pair icon AB indicating a combination of first application A and second application B, and a pair icon BC indicating a combination of second application B and third application C. For example, the at least one processor 120 may generate a pair icon (e.g., ABC) in which all of the plurality of applications A, B, and C of FIG. 6A are combined. For example, the at least one processor 120 may generate a pair icon (e.g., ABCD) in which all of the plurality of applications A, B, C, and D of FIG. 6B are combined. For example, the at least one processor 120 may generate a pair icon (e.g., ABD, ACD, BCD, AD, BD, and/or CD) by combining the application D newly added in the folded state as shown in FIG. 6A or the application D corresponding to the non-focused popup window D in the unfolded state as shown in FIG. 6B with at least one of the plurality of applications A, B, and C.

According to an embodiment, as illustrated in FIG. 6C, the at least one processor 120 may display the selected second screen 412 on the second display 163 and may display the second task bar 430 including the generated pair icons 610. The second task bar 430 may include at least one pair icon (e.g., the pair icon 610 of FIG. 6C) which is the icon of the multi-window corresponding to two or more applications and/or the icons (e.g., the icon 431, 432, and/or 433 of FIGS. 4 and 5) of the multi-window corresponding to one application. The second task bar 430 may include (e.g. may in some examples additionally include) a search bar 421. For example, the at least one processor 120 may display some of the icons of the designated multi-window in the area of the second task bar 430 as shown in FIG. 6C and hide the remaining icons of the multi-window not to be visually displayed. When the at least one processor 120 receives a designated input (e.g., a touch input or a scroll input), the at least one processor 120 may extend and display the second task bar 430, or may move icons of the multi-window hidden according to the scroll input into the area of the second task bar 430 and visually display the icons. The first task bar 420 may include a search bar 421 (e.g., a navigation bar), at least one predesignated icon 423, and at least one recently executed icon 425. The at least one predesignated icon 423 included in the first task bar 420 may be an icon different from the multi-window icon (e.g., the icons 431, 432, and 433 of FIGS. 4 and 5 and/or the pair icons 610 of FIG. 6) included in the second task bar 430. For example, at least one recently executed icon 425 may be included in the second task bar 430 according to the user's request.

According to an embodiment, when a first screen 411 is displayed in the second display 163, when a first application (e.g. first application A) is being executed, and the at least one processor 120 selects another icon (e.g., the second icon B 432 or the third icon C 433 of FIGS. 4 and 5) indicating another application in addition to the icon (e.g., the first icon A 431 of FIGS. 4 and 5) indicating first application A on the second task bar 430, the at least one processor 120 may additionally display a screen (e.g., the second screen 412 or the third screen 413 of FIGS. 4 and 5) of another application being executed corresponding to the other selected icon on the second display 163. For example, when the second icon B (e.g., the second icon 432 of FIGS. 4 and 5) indicating second application B is selected on the second task bar 430, the at least one processor 120 may divide the application display area of the second display 163 to display the second screen 412 corresponding to the second icon, and may reduce the size of the first screen 411 to display the first screen 411 and the second screen 412 as multi-windows in the divided areas, respectively. According to an embodiment, the at least one processor 120 may display the first icon A and the second icon B in different sizes or colors or with a visual effect applied thereto to represent display of the first screen 411 and the second screen 412 on the second display 163.

According to an embodiment, when the second icon B (e.g., the second icon 432 of FIGS. 4 and 5) corresponding to one second application B is selected from the second task bar 430, the at least one processor 120 may display the second screen 412 of second application B on the second display 163 in place of the currently displayed first screen 411 of first application A. According to an embodiment, when one icon 601 (e.g., the icon BCD) of the pair icons 610 corresponding to the two or more applications is selected from the second task bar 430, the at least one processor 120 may display the multi-window 630 for the two or more applications (e.g., second application B, third application C, and fourth application D) indicated by the selected pair icon 601 in the divided areas of the second display 163. According to an embodiment, when the home key 603 of the search bar 421 included in the second task bar 430 is selected, the at least one processor 120 may end multi-window execution, display a single window (e.g., a home screen 620 or an execution screen of a new application) corresponding to the home key 603 on the second display 163, and display the first task bar 420. Here, the first task bar 420 displayed on the second display 163 may have the same or smaller number of icons than the number of icons on the unfolded screen according to the size (or space) of the display area.

According to an embodiment, the at least one processor 120 may maintain multi-window execution between the first display 161 and second display 163, and may display a popup window (e.g., the screen D of the fourth application of FIG. 6) when displaying screens of two or more applications corresponding to the pair icon based on selection of the pair icon in the folded state. Since the at least one processor 120 may set the divided areas in consideration of the size of the display area of the second display 163, e.g., when executing multi-windows of three or more applications, the at least one processor 120 may display some applications as popup windows to increase visibility.

The electronic device 101 according to an embodiment may implement a software module (e.g., the program 140 of FIG. 1) for dynamically displaying a plurality of screens in the folded state to ensure continuity of the plurality of screens for the plurality of applications being executed. The memory 130 of the electronic device 101 may store commands (e.g., instructions) for implementing the software module. The at least one processor 120 may execute instructions stored in the memory 130 to implement the software module, and may control hardware (e.g., the sensor module 176, the display module 160, the power management module 188, or the communication module 190 of FIG. 1) related to the function of the software module. According to an embodiment, the software module of the electronic device 101 may include a kernel (or HAL), a framework (e.g., the middleware 144 of FIG. 1) and an application (e.g., the application 146 of FIG. 1). At least part of the program module may be preloaded on the electronic device 101 or may be downloaded from a server (e.g., the server 108). According to an embodiment, the components of the software module and the names of the components may be varied depending on the type of the operating system. According to an embodiment, at least a part of the software module may be implemented in software, firmware, hardware, or in a combination of two or more thereof. At least part of the software module may be implemented (e.g., executed) by e.g., a processor (e.g., an AP). At least a part of the software module may include at least one of, e.g., a module, program, routine, set of instructions, process, or the like for performing at least function.

As such, in an embodiment, the main components of the electronic device have been described through the electronic device 101 of FIGS. 1, 2A, 2B, 3A, and 3B. According to an embodiment, however, all of the components of FIGS. 1, 2A, 2B, 3A, and 3B are not essential components, and the electronic device 101 may be implemented with more or less components than those shown. The positions of the major components of the electronic device 101 described above in connection with FIGS. 1, 2A, 2B, 3A, and 3B may be varied according to various embodiments of the present invention.

According to an embodiment, an electronic device (e.g., the electronic device 101 of FIGS. 1 to 6) may comprise display circuitry (e.g., the display module 160 of FIG. 1) including a first display (e.g., the first display 161 of FIGS. 2A to 6) and a second display (e.g., the second display 163 of FIGS. 2A to 6), memory (e.g., the memory 130 of FIG. 1) storing instructions, and at least one processor (e.g., the processor 120 of FIG. 1) including a processing circuit. According to an embodiment, the instructions, when executed by the at least one processor individually or collectively, may cause the electronic device to, based on the electronic device being in an unfolded state, control the display circuitry to display, on the first display, a first task bar (e.g., the first task bar 420 of FIGS. 4, 5, and 6) and respective screens (e.g., the plurality of screens 411, 412, and 413 of FIGS. 4, 5, and 6) corresponding to each of a plurality of running applications. According to an embodiment, the at least one processor may be configured to generate at least one icon related to the plurality of applications based on the electronic device being changed from the unfolded state to a folded state. According to an embodiment, the at least one processor may be configured to, based on the electronic device being in the folded state, control the display circuitry to display, on the second display, at least one screen among the plurality of screens and a second task bar (e.g., the second task bar 430 of FIGS. 4, 5, and 6) including the generated at least one icon. According to an embodiment, the electronic device a housing (e.g., the housing 200 of FIGS. 2A, 2B, 3A, and 3B) configured to be foldable in a partial area.

According to an embodiment, the housing includes a first housing structure (e.g., the first housing structure 210 of FIGS. 2A, 2B, 3A, and 3B), a second housing structure (e.g., the second housing structure 220 of FIGS. 2A, 2B, 3A, and 3B) and a hinge structure (e.g., the hinge structure 230 of FIGS. 2A, 2B, 3A, and 3B), wherein the first housing structure (210) and second housing structure (220) are connected at either side of, and rotatable about, the hinge structure (230).

According to an embodiment, the first display may be disposed on a first surface of the first housing structure and the first surface of a second housing structure so that the partial area of the housing is foldable about the hinge structure.

According to an embodiment, the second display may be disposed on a second surface of the first housing structure or a second surface of the second housing structure.

According to an embodiment, the first task bar may include at least one of an icon of a favorite or frequently used application, an icon of a recently executed application, or a designated button.

According to an embodiment, the second task bar may differ from the first task bar and include at least one icon generated by objects indicating the plurality of running applications displayed on the first display or a combination of the objects. According to an embodiment, the second task bar may not overlap the at least one screen among the plurality of screens and may be displayed in a partial area of the second display.

According to an embodiment, the instructions, when executed by the at least one processor individually or collectively, may cause the electronic device to select the at least one screen from among the plurality of screens based on a priority, a recent execution of a respective application, a designated area of the first display or a selection input.

According to an embodiment, the instructions, when executed by the at least one processor individually or collectively, may cause the electronic device to, based on the electronic device changing from the folded state to the unfolded state: turn off the second display and control the display circuitry to maintain the execution of the plurality of applications and display the plurality of application screens on the first display.

According to an embodiment, the instructions, when executed by the at least one processor individually or collectively, may cause the electronic device to, based on the electronic device being in the folded state: execute at least one another application based on a designated gesture input or a designated button input, reduce a size of the at least one screen displayed on the second display based on execution of the at least one another application, control the display circuitry to display a screen of the at least one another application on the second display so as not to overlap the at least one screen and the second task bar, and add an icon indicating the at least one another application to the second task bar.

According to an embodiment, the instructions, when executed by the at least one processor individually or collectively, may cause the electronic device to, based on the electronic device being in the folded state: execute at least one another application based on a designated gesture input or a designated button input in the folded state and stop displaying the at least one screen on the second display and display a screen of the at least one another application on the second display.

According to an embodiment, the instructions, when executed by the at least one processor individually or collectively, may cause the electronic device to generate a pair icon corresponding to a combination of objects indicating two or more screens among the plurality of running applications on the first display, display the pair icon in the second task bar, and when the pair icon is selected, control the display circuitry to display the two or more application screens corresponding to the combination of the pair icon in divided areas, respectively, of the second display.

According to an embodiment, the instructions, when executed by the at least one processor individually or collectively, may cause the electronic device to display a screen of an application for an icon included in the second task bar on the second display by changing the at least one screen displayed on the second display to the screen of the application for the icon in response to a designated gesture input or a designated switching button input.

Figure 7:
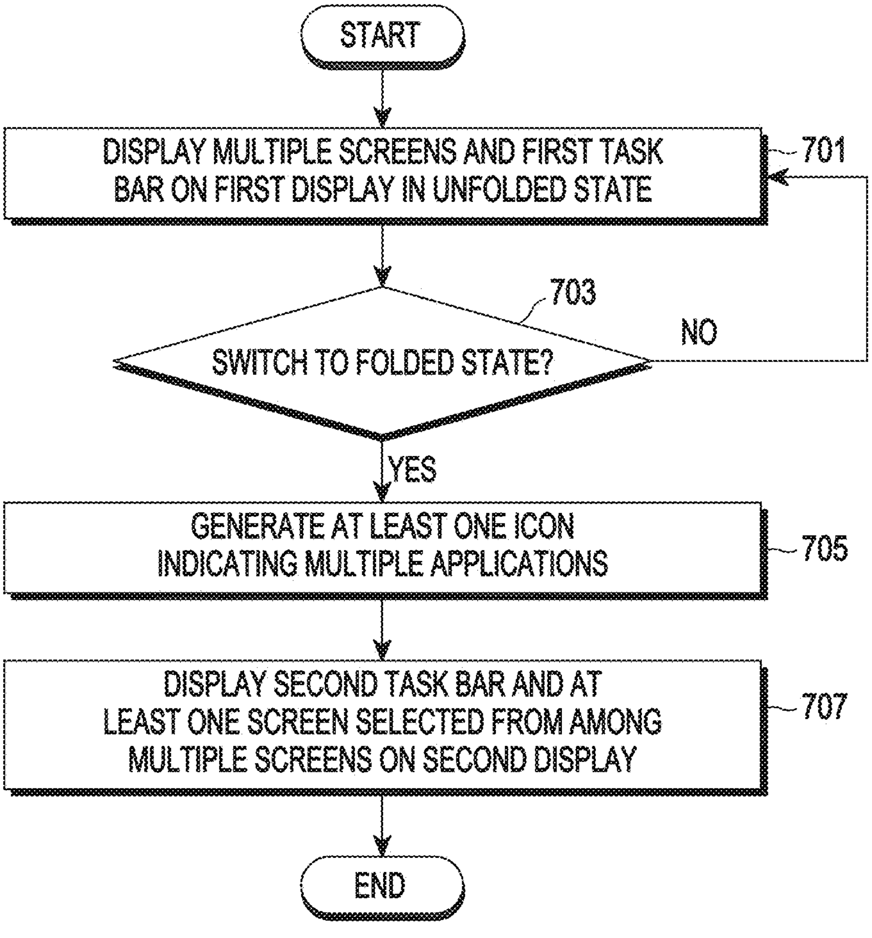
FIG. 7 is a flowchart illustrating an operation method in an electronic device according to an embodiment.

FIG. 7 is a flowchart illustrating an operation method in an electronic device according to an embodiment.

Referring to FIG. 7, in operation 701, according to an embodiment, an electronic device (e.g., the electronic device 101 of FIGS. 1 to 6) may execute a plurality of applications in a state in which a housing (e.g., the housing 200 of FIGS. 2A, 2B, 3A, and 3B) is unfolded, and may display a plurality of screens (e.g., the plurality of screens 411, 412, and 413 of FIGS. 4 to 6) for the executed plurality of applications on a first display (e.g., the first display 161 of FIGS. 2A to 6). The electronic device may display a first task bar (e.g., the first task bar 420 of FIG. 4) in a partial area (e.g., lower area) of the first display not to overlap a plurality of screens. Here, the first task bar may include an icon of a favorite or frequently used application, an icon of a recently executed application, or a designated menu (e.g., a button, an object, or a graphic element). According to an embodiment, the electronic device may display (e.g. may additionally display) a search bar (e.g., the search bar 421 of FIG. 4) on the first display. For example, the search bar may be included in the task bar and displayed or may be displayed in an area adjacent to the task bar not to overlap the task bar and the plurality of screens. The search bar may include at least one of a home, a back, or other system function icons. The icon included in the first task bar may be an icon (e.g., a shortcut icon) for quickly starting execution of an application or a designated command. According to an embodiment, the electronic device may hide the first task bar not to be exposed, display a plurality of screens on the first display, and when receiving a user input (e.g., a designated button input or a designated gesture input), resize the plurality of screens (e.g., reduce the size by the designated size of the first task bar) to display the first task bar in a partial area (e.g., a lower area) of the first display not to overlap the plurality of screens.

In operation 703, the electronic device may identify whether a portion of the housing is rotated to fold with respect to the folding axis (e.g., the folding axis A of FIGS. 2A and 2B or the folding axis B of FIGS. 3A and 3B) while the plurality of screens are displayed. Upon identifying that a portion of the housing is changed to the folded state as a result of the identification, the electronic device may perform operation 705 and, upon identifying that the portion is not changed to the folded state, perform operation 701 while remaining in the unfolded state of the housing of the electronic device.

In operation 705, the electronic device may generate at least one icon related to a plurality of applications, based on a portion of the housing changing to the folded state. According to an embodiment, the electronic device may generate at least one icon (e.g., at least one of an icon indicating each application or at least one pair icon indicating a combination of applications) indicating the plurality of screens for continuous use of the plurality of screens. According to an embodiment, the electronic device may set a display attribute of a second task bar (e.g., the second task bar 430) including at least one generated icon. Here, the display attribute may include at least one attribute among the size, the color, the display position, the number of icons that may be visually exposed, display information (e.g., the size, the display position, or the display order) about the icon to be included, or whether to hide or expose all or at least one included icon of the second task bar by a designated input.

In operation 707, in the folded state, the electronic device may display, on the second display (e.g., the second display 163 of FIGS. 2A, 2B, and 4), a second task bar including at least one screen (e.g., the first screen 411 ("A") of FIG. 4) among the plurality of screens and the generated at least one icon. The second task bar may be different from the first task bar, may include at least one icon related to the plurality of applications for continuous use of the plurality of screens, and may be displayed in a partial area (e.g., a lower area) of the second display 163 not to overlap at least one screen (e.g., the first screen 411 ("A")) on the second display. According to an embodiment, when the housing is unfolded or when the housing starts to fold, the electronic device may select at least one screen from among the plurality of screens and may display the selected at least one screen on the second display not to overlap the second task bar. For example, the electronic device may select a screen selection input by the user from among the plurality of screens displayed on the first display, a screen displayed in a specified main area from among the divided areas of the first display, a screen in use just before folding, or a screen for the last executed application. However, examples of selection are not limited thereto. Since the size of the second display is smaller than the size of the first display, the electronic device may select a smaller number of screens than the number of the plurality of screens displayed on the first display.

According to an embodiment, when there are two or more selected screens in the first display, the electronic device may divide the application display area (e.g., the area other than the second task bar or the entire area) of the second display by the number of selected screens, and may display the selected screens in each of the divided areas. However, the disclosure is not limited thereto, and when there are two or more selected screens, the electronic device may display the screen selected as the main screen as a screen having a large size on the entire application display area of the second display, and may display the screen selected as the sub screen as a screen having a small size by partially overlapping the application display area. Here, when the sub screen is selected, the electronic device may change to each other to display the main screen as the screen having the small size, and display the sub screen as the screen having the large size.

Figure 8:
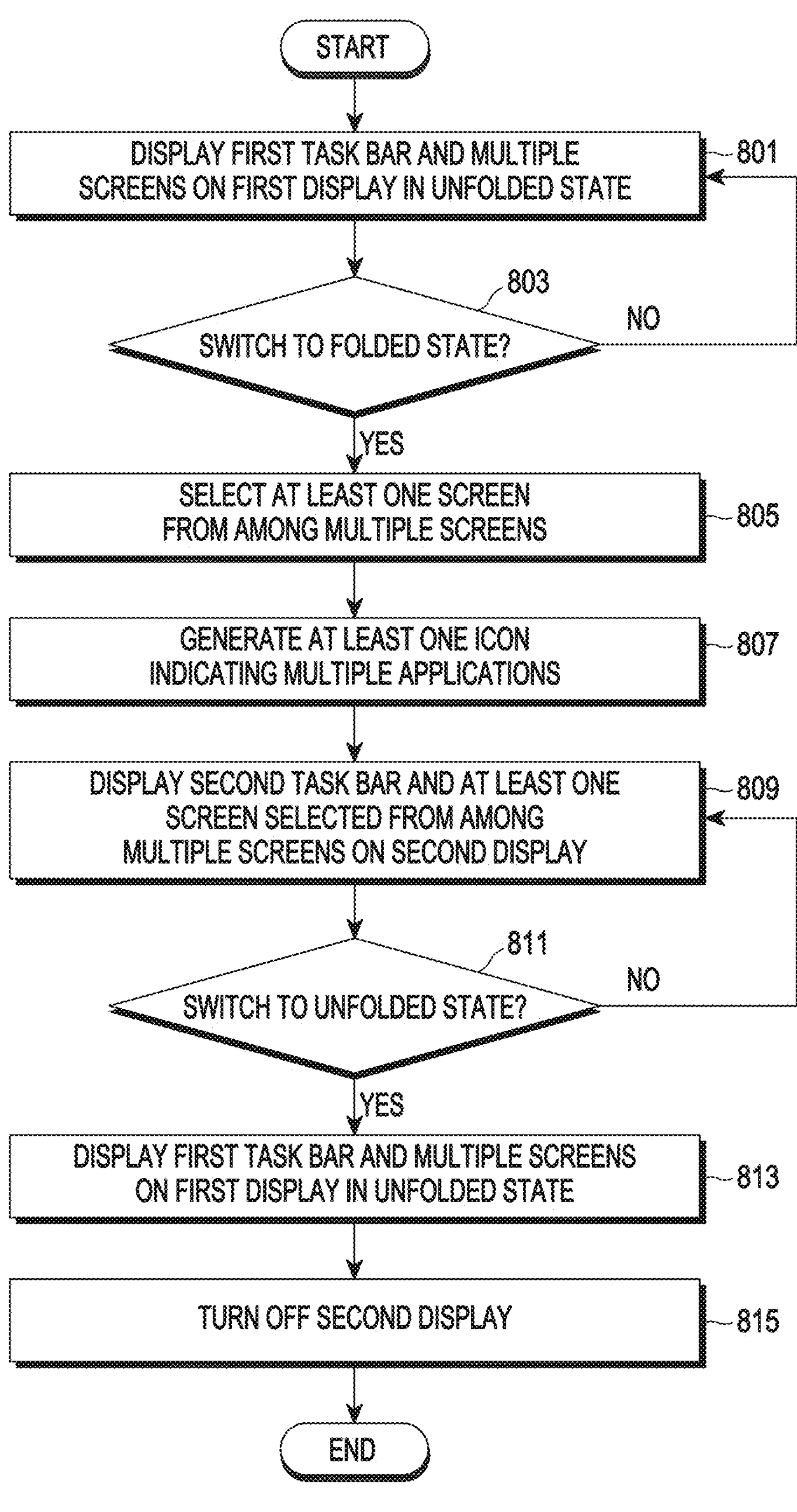
FIG. 8 is a flowchart illustrating an operation method in an electronic device according to an embodiment.
Figure 9:
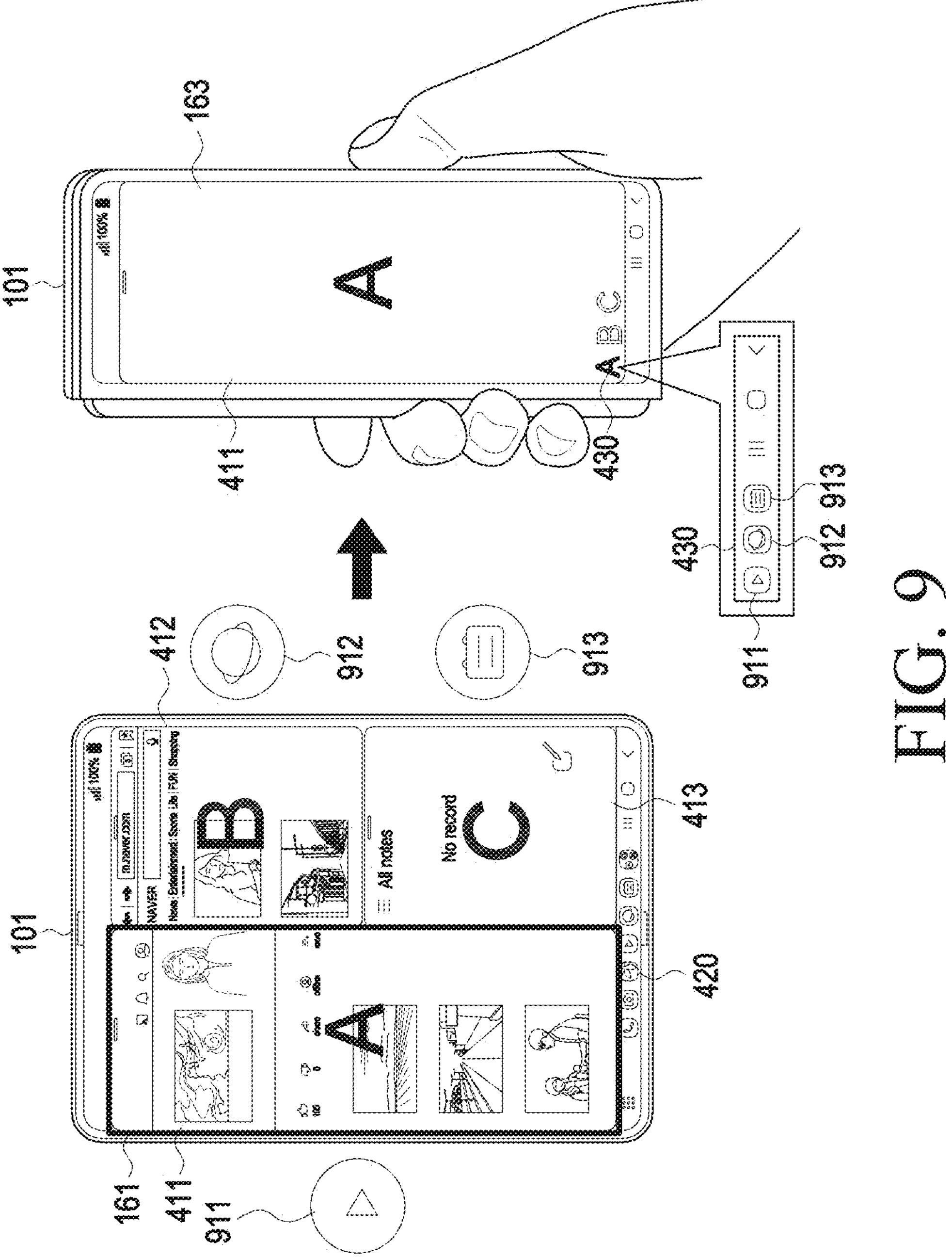
FIG. 9 is a view illustrating an example of displaying a screen when changing to a folded state in an electronic device according to an embodiment.
Figure 10:
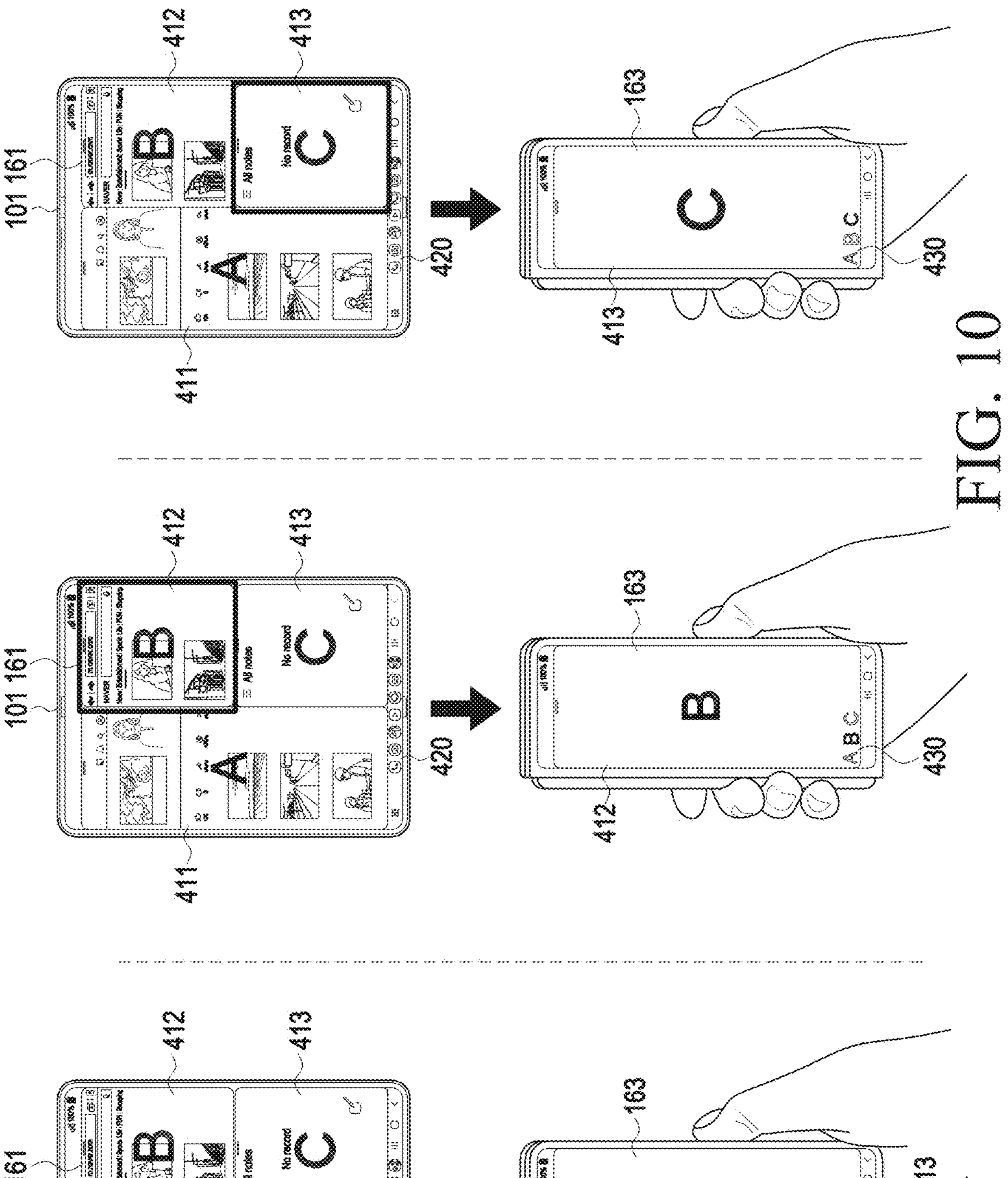
FIG. 10 is a view illustrating an example of displaying a screen when changing to a folded state in an electronic device according to an embodiment.
Figure 11:
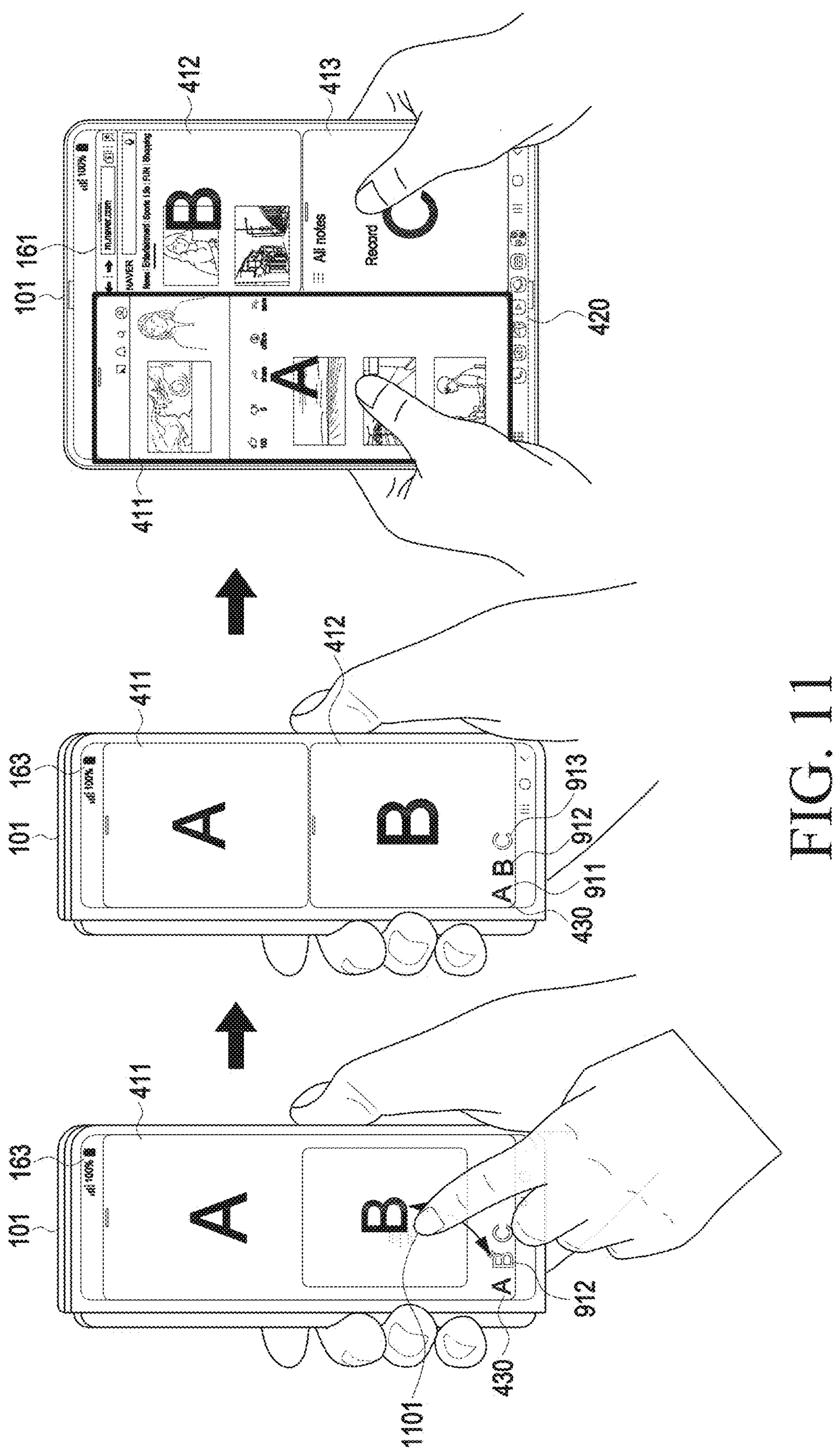
FIG. 11 is a view illustrating an example of displaying a screen in a folded state and an example of displaying a screen when changing to an unfolded state in an electronic device according to an embodiment.

FIG. 8 is a flowchart illustrating an operation method in an electronic device according to an embodiment. FIG. 9 is a view illustrating an example of displaying a screen when changing to a folded state in an electronic device according to an embodiment. FIG. 10 is a view illustrating an example of displaying a screen when changing to a folded state in an electronic device according to an embodiment. FIG. 11 is a view illustrating an example of displaying a screen in a folded state and an example of displaying a screen when changing to an unfolded state in an electronic device according to an embodiment.

Referring to FIGS. 8, 9, 10, and 11, in operation 801, according to an embodiment, an electronic device 101 (e.g., the electronic device 101 of FIGS. 1 to 6) may execute a plurality of applications A, B, and C in a state in which a housing (e.g., the housing 200 of FIGS. 2A, 2B, 3A, and 3B) is unfolded, and may display a plurality of screens 411, 412, and 413 (e.g., the plurality of screens 411, 412, and 413 of FIGS. 4 to 6) for the executed plurality of applications on a first display 161 (e.g., the first display 161 of FIGS. 2A to 6). The electronic device 101 may display a first task bar 420 (e.g., the first task bar 420 of FIG. 4) in a partial area (e.g., lower area) of the first display 161 not to overlap a plurality of screens 411, 412, and 413. Here, the first task bar 420 may include an icon of a favorite or frequently used application, an icon of a recently executed application, or a designated button (e.g., a menu, an object, or a graphic element). According to an embodiment, the electronic device 101 may display (e.g. may additionally display) a search bar 421 (e.g., the search bar 421 of FIG. 4) on the first display 161. In some examples, the search bar 421 may be included in the task bar and displayed or may be displayed in an area adjacent to the task bar not to overlap the first task bar 420 and the plurality of screens 411, 412, and 413. The icon included in the first task bar 420 may be an icon (e.g., a shortcut icon) for quickly starting execution of an application or a designated command. According to an embodiment, the electronic device 101 may hide the first task bar 420 not to be exposed, display the plurality of screens 411, 412, and 413 on the first display 161, and adjust (e.g., reduce the size by the designated size of the first task bar) the sizes of the plurality of screens 411, 412, and 413 when receiving a user input (e.g., a designated button input or a designated gesture input) not to overlap the plurality of screens 411, 412, and 413, and may display the first task bar 420 in a partial area (e.g., a lower area) of the first display 161.

In operation 803, the electronic device 101 may identify whether a portion of the housing is rotated to fold with respect to the folding axis (e.g., the folding axis A of FIGS. 2A and 2B or the folding axis B of FIGS. 3A and 3B) while the plurality of screens 411, 412, and 413 are displayed. Upon identifying that a portion of the housing is changed to the folded state as a result of the identification, the electronic device 101 may perform operation 805 and, upon identifying that the portion is not changed to the folded state, perform operation 801 (that is, to continue to perform operation 801) while remaining in the unfolded state of the housing of the electronic device. Herein, in examples of the disclosure, a folded state and unfolded state of the housing may also correspond to a folded or unfolded state of the electronic device.

In operation 805, the electronic device 101 may select at least one screen from the plurality of screens 411, 412, and 413 displayed on the first display 161, based on a portion of the housing 200 changing to the folded state. According to an embodiment, when the housing is unfolded or when the housing starts to fold, the electronic device 101 may select at least one screen from among the plurality of screens 411, 412, and 413 and may display the selected at least one screen on the second display 163 not to overlap the second task bar 430. For example, the electronic device 101 may select a screen based on a priority (e.g. at least one screen with a high priority) from among the plurality of screens 411, 412, and 413 displayed on the first display 161, a screen selection input by the user, a screen displayed in a designated main area from among the divided areas of the first display 161, a screen in use just before folding, or a screen for the last executed application (e.g., a recent execution screen). Since the size of the second display 163 is smaller than the size of the first display 161, the electronic device 101 may select a number of screens smaller than the number of the plurality of screens 411, 412, and 413 displayed on the first display 161. For example, as illustrated in FIG. 9, the electronic device 101 may select the first screen 411 (A) from among the plurality of screens 411, 412, and 413 displayed on the first display 161.

In operation 807, the electronic device 101 may set display attributes for the plurality of screens 411, 412, and 413 to maintain continuity of the plurality of screens 411, 412, and 413 displayed on the first display 161, and may generate icons related to the plurality of running applications A, B, and C. As illustrated in FIG. 9, the electronic device 101 may generate icons 911, 912, and 913 respectively corresponding to the plurality of applications A, B, and C. Here, the generated icons 911, 912, and 913 may be generated as the same images as icons (e.g., shortcut icons) of the corresponding applications A, B, and C displayed on the home screen or the icon setting screen, or may be generated using content included in the currently displayed screen. According to an embodiment, the electronic device 101 may generate at least one pair icon (e.g., the pair icons 610 of FIG. 6) indicating the plurality of screens 411, 412, and 413 for continuous use of the plurality of screens 411, 412, and 413. According to an embodiment, the electronic device 101 may set a display attribute of a second task bar 430 (e.g., the second task bar 430 of FIG. 4) including at least one generated icon 911, 912, and 913. Here, the display attribute may include at least one attribute among the size, the color, the display position, the number of icons that may be visually exposed, display information (e.g., the size, the display position, or the display order) about the icon to be included, or whether to hide or expose the whole of the second task bar 430 or at least one icon included in the second task bar 430 by a designated input.

In operation 809, in the folded state, the electronic device 101 may display, on the second display (e.g., the second display 163 of FIGS. 2A, 2B, and 4), a second task bar 430 including at least one screen (e.g., the first screen 411 ("A") of FIG. 4) among the plurality of screens 411, 412, and 413 and the generated at least one icon. The second task bar 430 may be different from the first task bar 420, may include at least one icon (e.g., at least one of the icons 431, 432, and 433 of FIGS. 4 and 5) related to the plurality of applications for continuous use of the plurality of screens, and may be displayed in a partial area (e.g., a lower area) of the second display 163 not to overlap at least one screen (e.g., the first screen 411 ("A")) on the second display.

As illustrated in FIG. 10, according to an embodiment, when the first screen 411 is selected, the electronic device 101 may display the first screen 411 in the application display area of the second display 163, and may display the second task bar 430 including icons 911, 912, and 913 generated corresponding to the first screen 411, the second screen 412, and the third screen 413, respectively. Here, the icon 911 corresponding to the first screen 411 may be displayed in a different size or color or with a visual effect applied thereto to represent that the icon is displayed in the application display area of the second display 163. As illustrated in FIG. 10, according to an embodiment, when the second screen 412 is selected, the electronic device 101 may display the second screen 412 in the application display area of the second display 163, and may display the icon 912 corresponding to the second screen 412 in a different size or color or with a visual effect applied thereto. As illustrated in FIG. 10, according to an embodiment, when the third screen 413 is selected, the electronic device 101 may display the third screen 413 in the application display area of the second display 163, and may display the icon 913 corresponding to the third screen 413 in a different size or color or with a visual effect applied thereto.

According to an embodiment, when there are two or more selected screens, the electronic device 101 may divide the application display area (e.g., the area other than the second task bar or the entire area) of the second display 163 by the number of selected screens, and may display the selected screens in each of the divided areas. However, the disclosure is not limited thereto, and when there are two or more selected screens, the electronic device 101 may display the screen selected as the main screen as a screen having a large size on the entire application display area of the second display 163, and may display the screen selected as the sub screen as a screen having a small size by partially overlapping the application display area. Here, when the sub screen is selected, the electronic device 101 may change to display the main screen as the screen having the small size, and display the sub screen as the screen having the large size.

According to an embodiment, in operation 809, the electronic device 101 may additionally display a screen (e.g., the second screen 412 or the third screen 413 of FIGS. 9 and 11) of the running application corresponding to the selected icon on the second display 163, based on selection of another icon (e.g., the second icon 912 or the third icon 913 of FIGS. 9 and 11) on the second task bar 430 in addition to the icon 911 corresponding to the first application A displayed on the second display 163. For example, as illustrated in FIG. 11, when the selection input 1101 (e.g., a drag-and-drop input) of the second icon 912 is received on the second task bar 430 to an area of the second display 163, the electronic device 101 may divide the application display area to display the second screen 412 corresponding to the second icon 912, and may reduce the size of the first screen 411 to display the first screen 411 and the second screen 412 as multi-windows in the divided areas, respectively. The electronic device 101 may display the first icon 911 and the second icon 912 in different sizes or colors or with a visual effect applied thereto to represent display of the first screen 411 and the second screen 412 on the second display 163.

In operation 811, the electronic device 101 may identify whether the housing 200 is changed from the folded state to the unfolded state again. As a result of the identification, if it is identified that the housing 200 is changed to the unfolded state, the electronic device 101 may perform operation 813, and if it is identified that the housing 200 is not changed to the unfolded state, the electronic device 101 may continue to perform operation 809.

In operation 813, the electronic device 101 may display, on the first display 161, the first task bar 420 and the plurality of screens 411, 412, and 413 for the plurality of running applications A, B, and C, based on changing from the folded state to the unfolded state again. As illustrated in FIG. 11, the plurality of running applications A, B, and C may be the same as the applications A, B, and C indicated by the icons 911, 912, and 913 included in the second task bar 430 of the second display 163. The plurality of applications running in operation 811 may be different from the plurality of applications running in operation 801. Accordingly, some of the screens displayed on the first display in operation 813 may be different from some of the screens displayed in operation 801. According to an embodiment, when a new application is executed while performing operation 809, the electronic device 101 may maintain execution of the new application and may display a screen for the new application in a designated divided area on the first display 161. When the new application is executed while performing operation 809, the electronic device 101 may add a new icon for the new application to the second task bar 430 displayed on the second display 163. According to an embodiment, when some applications are terminated while performing operation 809, the electronic device 101 may not display a screen for the terminated application on the first display. When the execution of some applications is terminated while performing operation 809, the electronic device 101 may remove the icon for the terminated application from the second task bar 430 displayed on the second display 163.

In operation 815, the electronic device 101 may turn off the second display 163. According to an embodiment, when the housing 200 is fully unfolded, the electronic device 101 may turn off the second display 163. According to an embodiment, when the housing 200 is unfolded to the intermediate state, the electronic device 101 may apply and display a visual effect such that the screens displayed on the second display 163 gradually disappear, and may apply and display a visual effect such that the screens 411, 412, and 413 for the plurality of applications A, B, and C running on the first display 161 gradually appear. The electronic device 101 may turn off the second display 163 when the screens 411, 412, and 413 displayed on the second display 163 completely disappear. Without limitation to operation 815, according to an embodiment, the electronic device 101 may stop displaying the at least one screen (e.g., the first screen 411) and the second task bar 430 displayed on the second display 163 without turning off the second display 163, and may display a menu or screen (e.g., a clock) according to a designated function or command on the second display 163 in operation 809.

Figure 12:
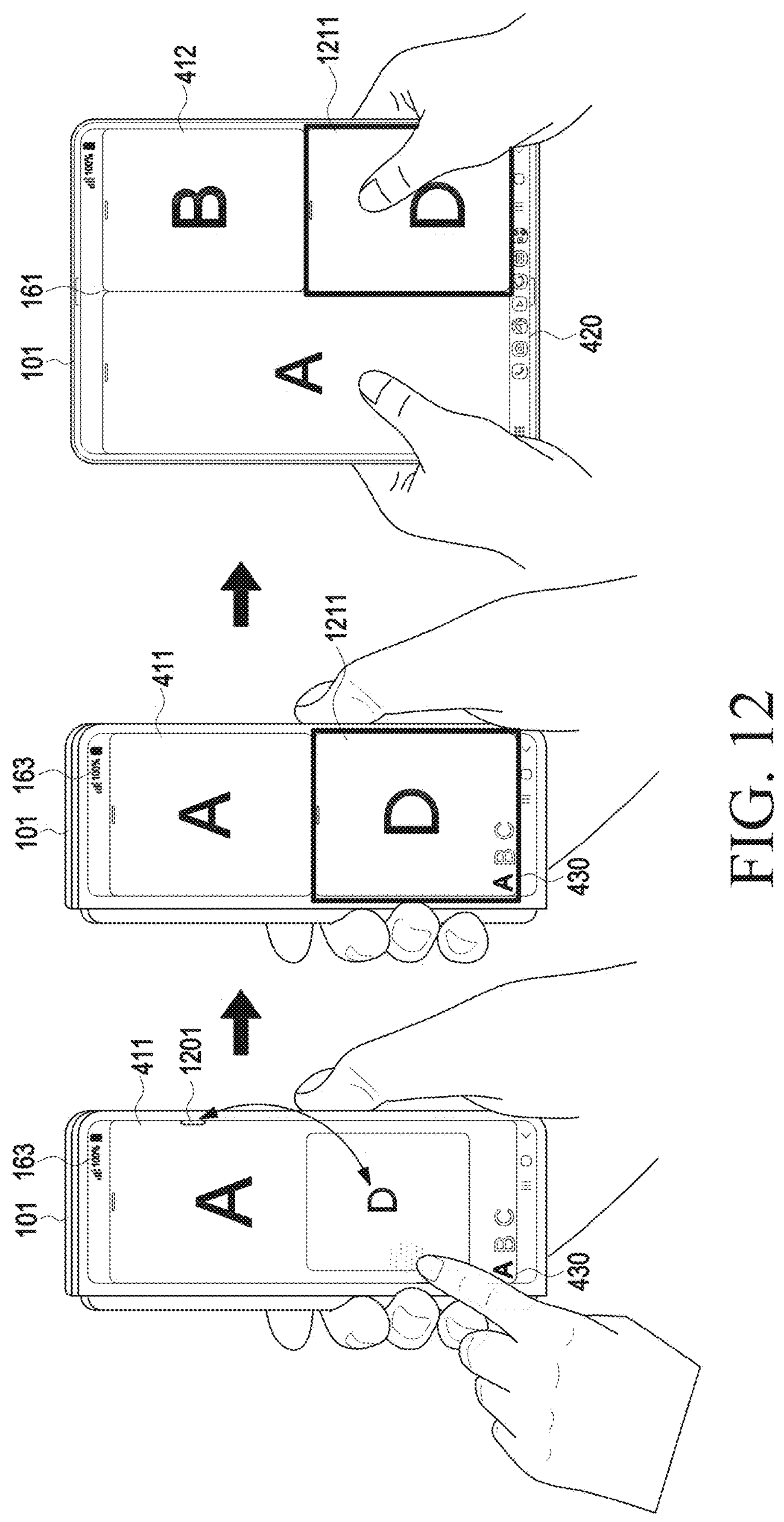
FIG. 12 is a view illustrating an example of displaying a new application in a folded state and an example of displaying a new application when changing to an unfolded state in an electronic device according to an embodiment.
Figure 13:
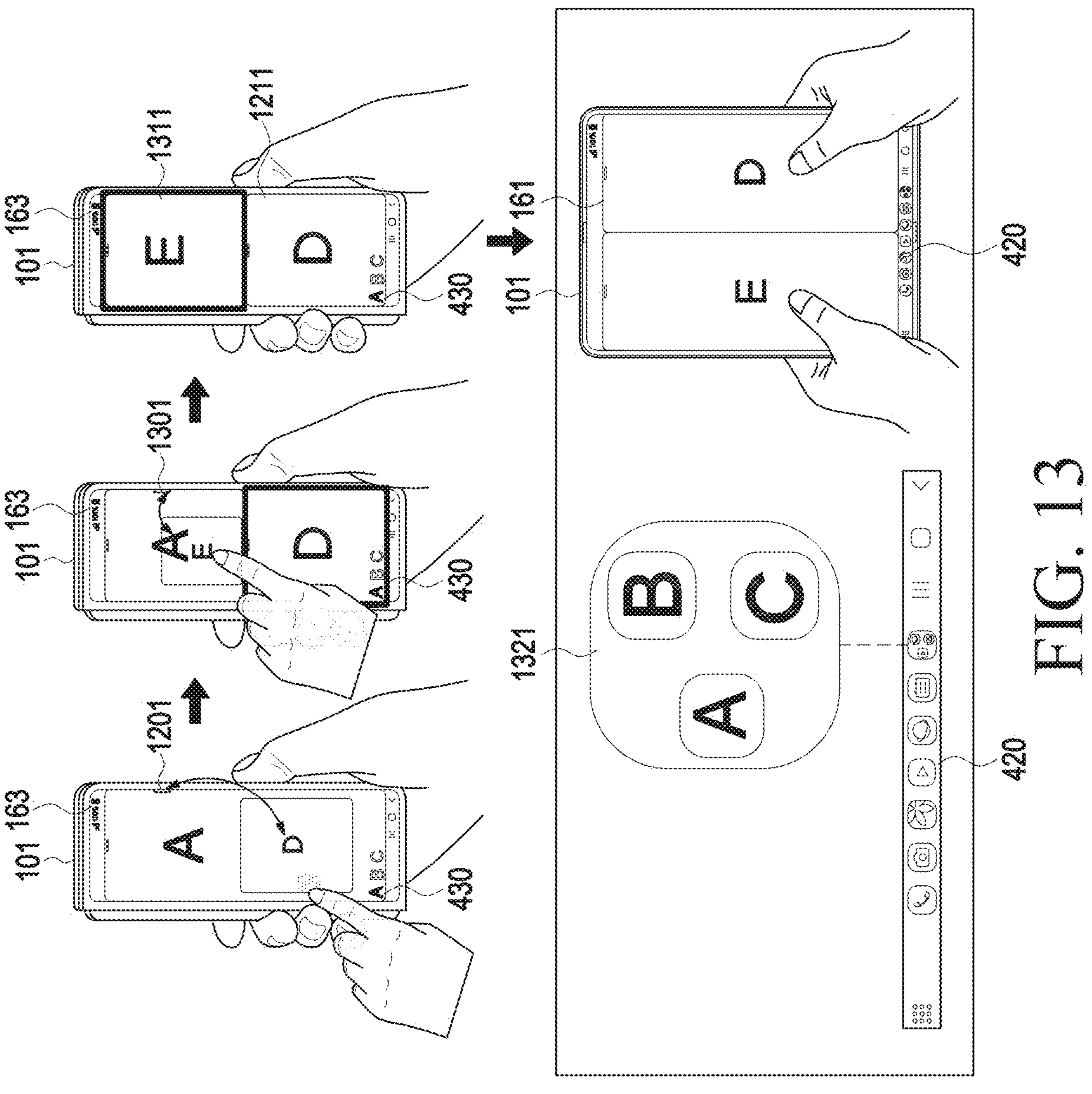
FIG. 13 is a view illustrating an example of displaying a new application in a folded state and an example of displaying a new application when changing to an unfolded state in an electronic device according to an embodiment.

FIGS. 12 and 13 are views illustrating an example of displaying a new application in a folded state and an example of displaying a new application when changing to an unfolded state in an electronic device according to an embodiment.

Referring to FIG. 12, when the user's designated gesture input 1201 (e.g., selection of a shortcut icon included in an edge screen and a drag-and-drop input) is received in a partial area (e.g., an edge handle) of a housing (e.g., the housing 200 of FIGS. 2A, 2B, 3A, and 3B), an electronic device (e.g., the electronic device 101 of FIGS. 1 to 6) according to an embodiment may execute a new application D (e.g., a fourth application) and display a screen 1211 (hereinafter, referred to as a fourth screen) for the executed new application D on the second display 163. According to an embodiment, the electronic device 101 may divide the application display area of the second display 163, reduce the size of the first screen 411 to the size of one divided area, and may display a fourth screen 1211 in the other divided area. The electronic device 101 may generate a new icon (not shown) for the new application D and may display the generated new icon on the second task bar 430. According to an embodiment, when a first touch input (e.g., a normal touch input not related to a multi-window or a home key selection input) for the new application D is received, the electronic device 101 may stop execution of the multi-window, may execute the new application D alone to display the execution screen on the second display 163, and may change the second task bar 430 to the first task bar 420 to display the first task bar 420 on the second display 163. According to an embodiment, when a first touch input (e.g., a drag-and-drop input or a pair icon input related to a multi-window) for the new application D is received, the electronic device 101 may maintain execution of the multi-window, may maintain display of the second task bar 430, and may display the first screen 411 of the currently executed first application A and the screen 1211 of the new application D in the divided areas of the second display 163, respectively.

According to an embodiment, when changing from the folded state to the unfolded state, the electronic device 101 may display the first screen 411 and the fourth screen 1201 displayed on the second display 163 on the first display 161, and may display (e.g. may additionally display) at least one of the remaining second application B and the third application C on the first display 161. For example, when the application display area of the first display 161 is divided into three display areas, an application having a higher priority according to use, of the second application B and the third application C, may be displayed, and the running application where the screen is not displayed may generate an icon indicating that the application is being executed and may add the icon to the first task bar 420 or may display an object indicating the running application where the screen is not displayed in a partial area of the first display 161. By selecting such an object, one of the displayed screens may be hidden, and the screen of the running application where the screen is not displayed may be displayed on the first display 161.

Referring to FIGS. 12 and 13, according to an embodiment, when the user's designated gesture input 1301 (e.g., a selection and drag-and-drop input of a shortcut icon included in an edge screen) is additionally received in a partial area (e.g., an edge handle) of the housing, the electronic device according to an embodiment may execute a new application E (e.g., a fifth application) and may display a screen 1311 (hereinafter, referred to as a fifth screen) for the executed new application E on the second display 163. The electronic device 101 may display the fifth screen 1311 in place of the first screen 411 displayed at the position (e.g., an upper divided area) indicated by the user's gesture input (e.g. a drag and drop input) in the divided areas of the second display 163. The electronic device 101 may generate a new icon (not shown) for the new application E and may display the generated new icon on the second task bar 430. The electronic device 101 may generate a pair icon (e.g., at least one of AB, AC, BC, or ABC) indicating a combination of the first application A, the second application B, and the third application C, the screens of which are not displayed on the second display 163, and may add the generated pair icon to the second task bar 430. The electronic device 101 may generate a pair icon (e.g., DE) indicating a combination of the new fourth application D and fifth application E, and may add the generated pair icon to the second task bar 430. The electronic device 101 may generate a pair icon (e.g., at least one of ABD, BCD, or ACD) indicating a combination of first application A, second application B, third application C, and new application D (or fifth application E), and may add the generated pair icon to the second task bar 430.

According to an embodiment, when changing from the folded state to the unfolded state, the electronic device 101 may display the fourth screen 1211 and the fifth screen 1311 displayed on the second display 163 on the first display 161, and may display at least one of the remaining first application A, second application B and the third application C on the first display 161. For example, when the application display area of the first display 161 is divided into three display areas, an application having a higher priority according to use, of the running first application A, second application B and the third application C, may be displayed, and the running application where the screen is not displayed may generate an icon indicating that the application is being executed and may add the icon to the first task bar 420 or may display an object indicating the running application where the screen is not displayed in a partial area of the first display 161. By selecting such an object, one of the displayed screens may be hidden, and the screen of the running application where the screen is not displayed may be displayed on the first display 161. Referring to FIGS. 12 and 13, when the user's designated gesture input 1301 (e.g., selection of a shortcut icon included in an edge screen and a drag-and-drop input) is additionally received in a partial area (e.g., an edge handle) of the housing, the electronic device 101 according to an embodiment may execute a new application E (e.g., a fifth application), and may display a screen 1311 (hereinafter, referred to as a fifth screen) for the executed new application E on the second display 163.

Figure 14:
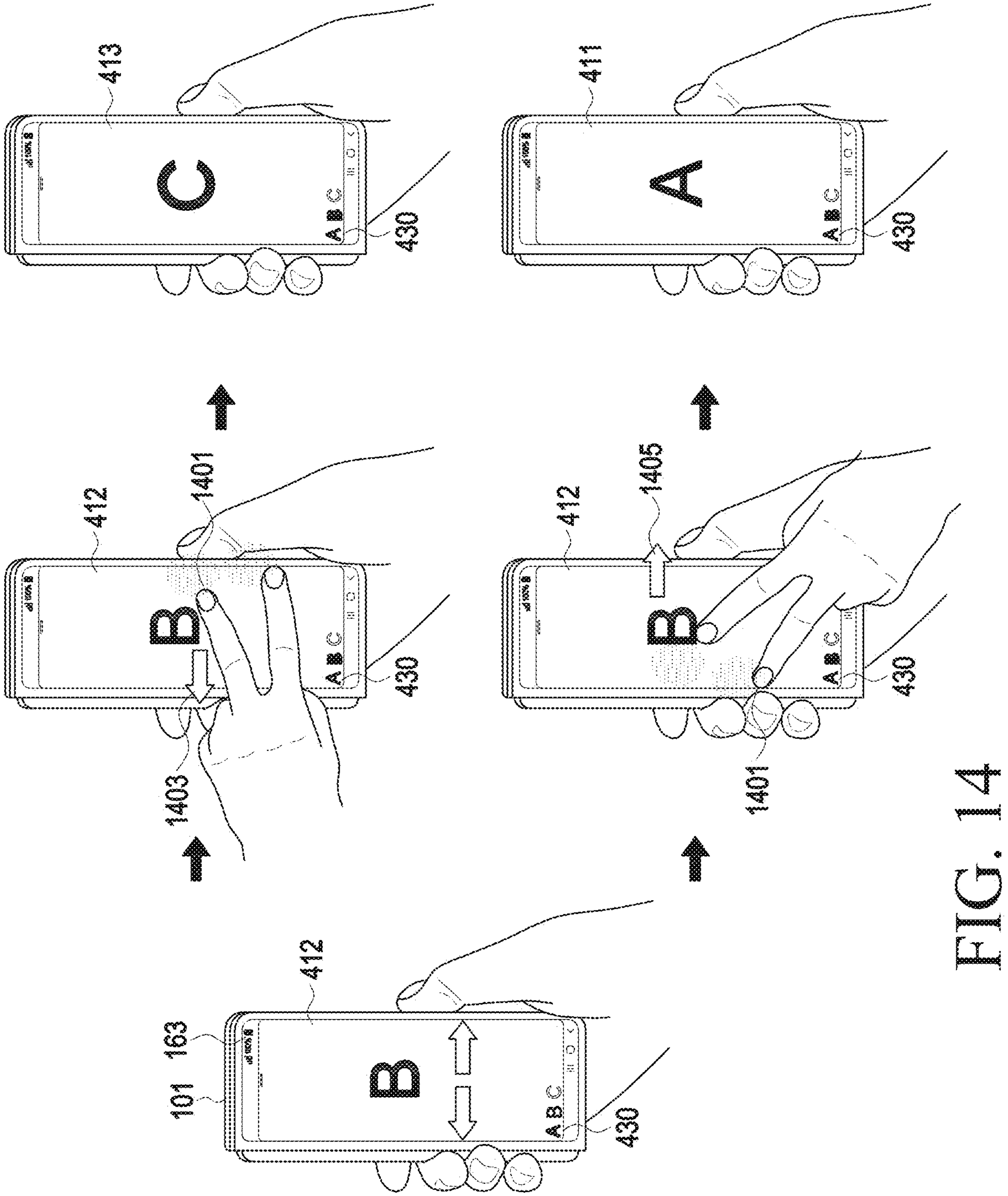
FIG. 14 is a view illustrating an example of displaying a screen when changing to a folded state in an electronic device according to an embodiment.
Figure 15:
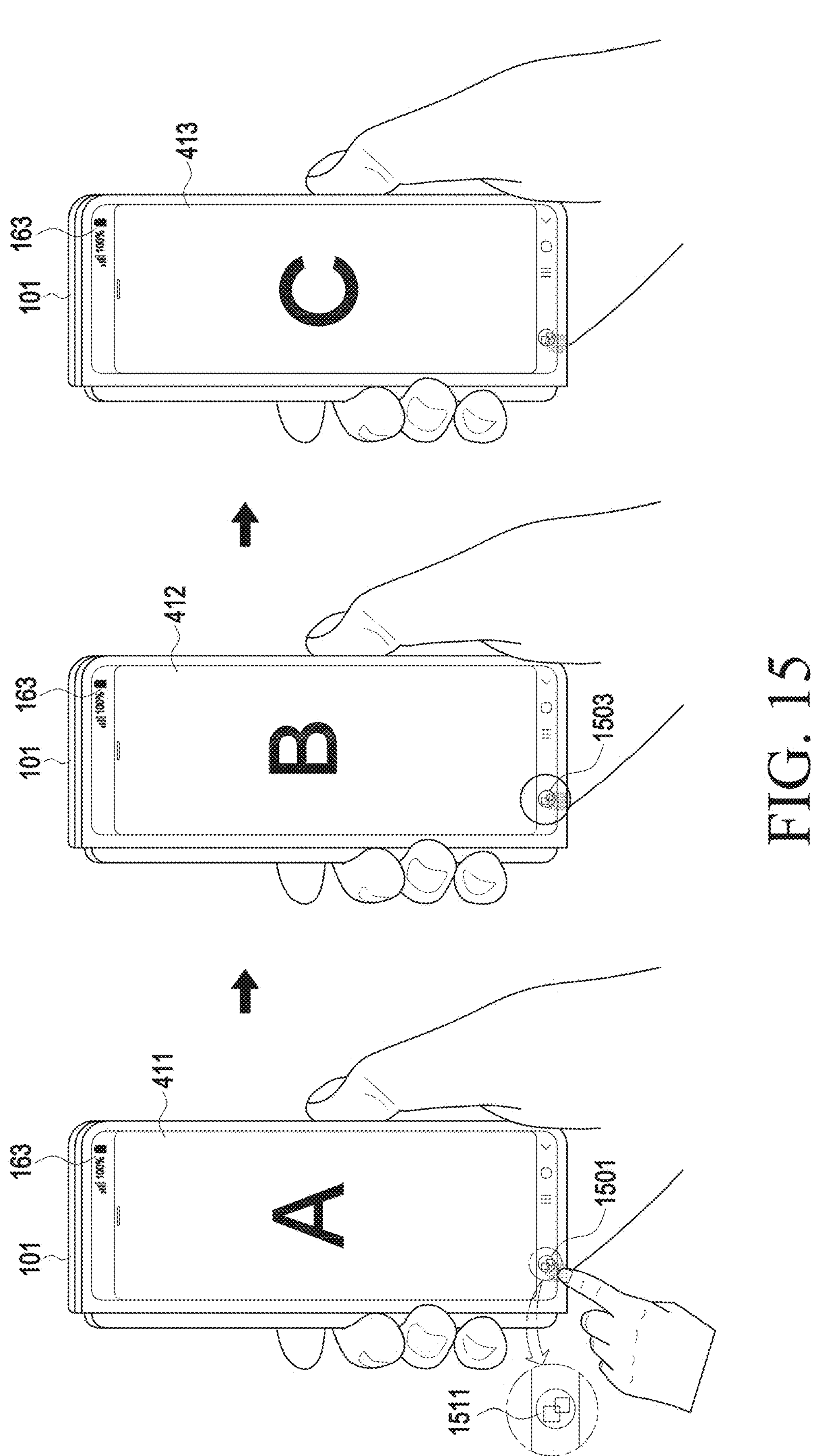
FIG. 15 is a view illustrating an example of displaying a screen when changing to a folded state in an electronic device according to an embodiment.
Figure 16:
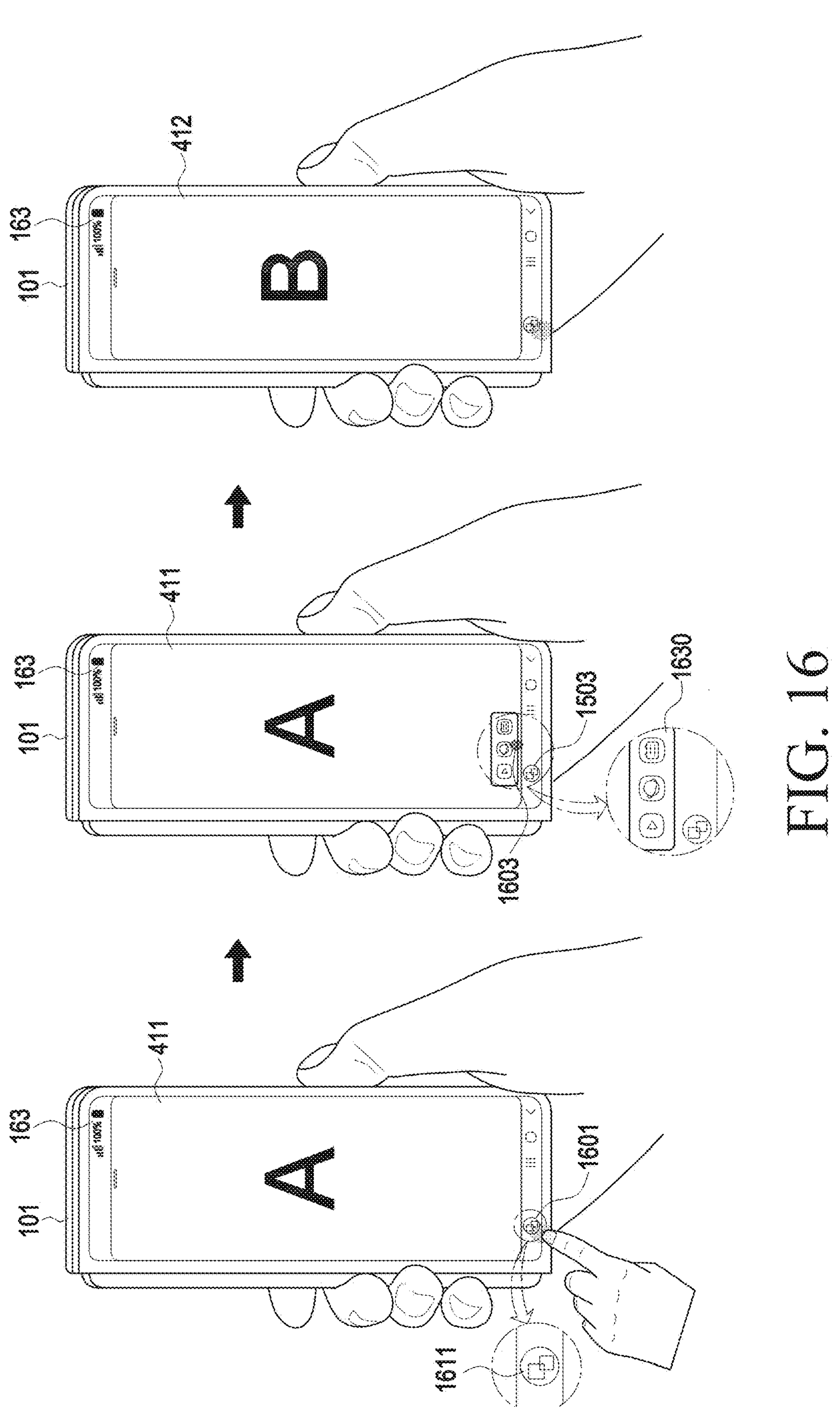
FIG. 16 is a view illustrating an example of displaying a screen when changing to a folded state in an electronic device according to an embodiment.

FIGS. 14, 15, and 16 are views illustrating an example of displaying a screen when changing to a folded state in an electronic device according to an embodiment.

Referring to FIGS. 14, 15, and 16, when a selection input 1501 or 1503 of a gesture input (e.g., a two-finger gesture input) or a designated button input 1511 (e.g., an action inducer button input) is received, the electronic device 101 (e.g., the electronic device 101 of FIGS. 1 to 6) according to an embodiment may change the screen (e.g., the second screen 412) displayed in an application area of the second display 163 to the screen (e.g., the first screen 411 or the third screen 413) of another application being executed. For example, whenever the electronic device 101 receives the designated gesture input 1401 or the designated button input 1501 (that is, an input to button, or icon, 1501), the electronic device 101 may sequentially change (e.g., A→B→C) to screens respectively corresponding to icons included in the second task bar 430. That is, each consecutive input (e.g. a first input, a second input, a third input) to the designated button 1501 may sequentially change to the next screen. In some examples, the sequence of screens may correspond to the order (or sequence) of icons included in the second task bar 430. For example, the electronic device 101 may display a screen (e.g., the first screen 411 or the third screen 413) corresponding to one icon among icons included in the second task bar 430 in the application display area of the second display 163, based on the input direction 1403 or 1405 of the designated gesture input 1401.

According to an embodiment, as illustrated in FIG. 16, the electronic device 101 may hide the second task bar 430 or may hide icons indicating applications running on the second task bar 430 not to be exposed, and may add a designated button 1611 (e.g., an action inducer button) to display the second task bar 430. When the selection input 1601 of the designated button 1611 is received, the electronic device 101 may display an extension task bar 1630 including icons indicating running applications. In some examples, the extension task bar 1630 may be displayed so as to pop up, or overlap, a portion of the second display, adjacent to the second task bar 430. When an input 1603 for selecting an icon (e.g., the second icon) selected from the extension task bar 1630 is received, the electronic device

101 may display the second screen 412 of the second application B corresponding to the second icon, in place of the first screen 411 of the first application A displayed in the application display area of the second display 163.

Figure 17:
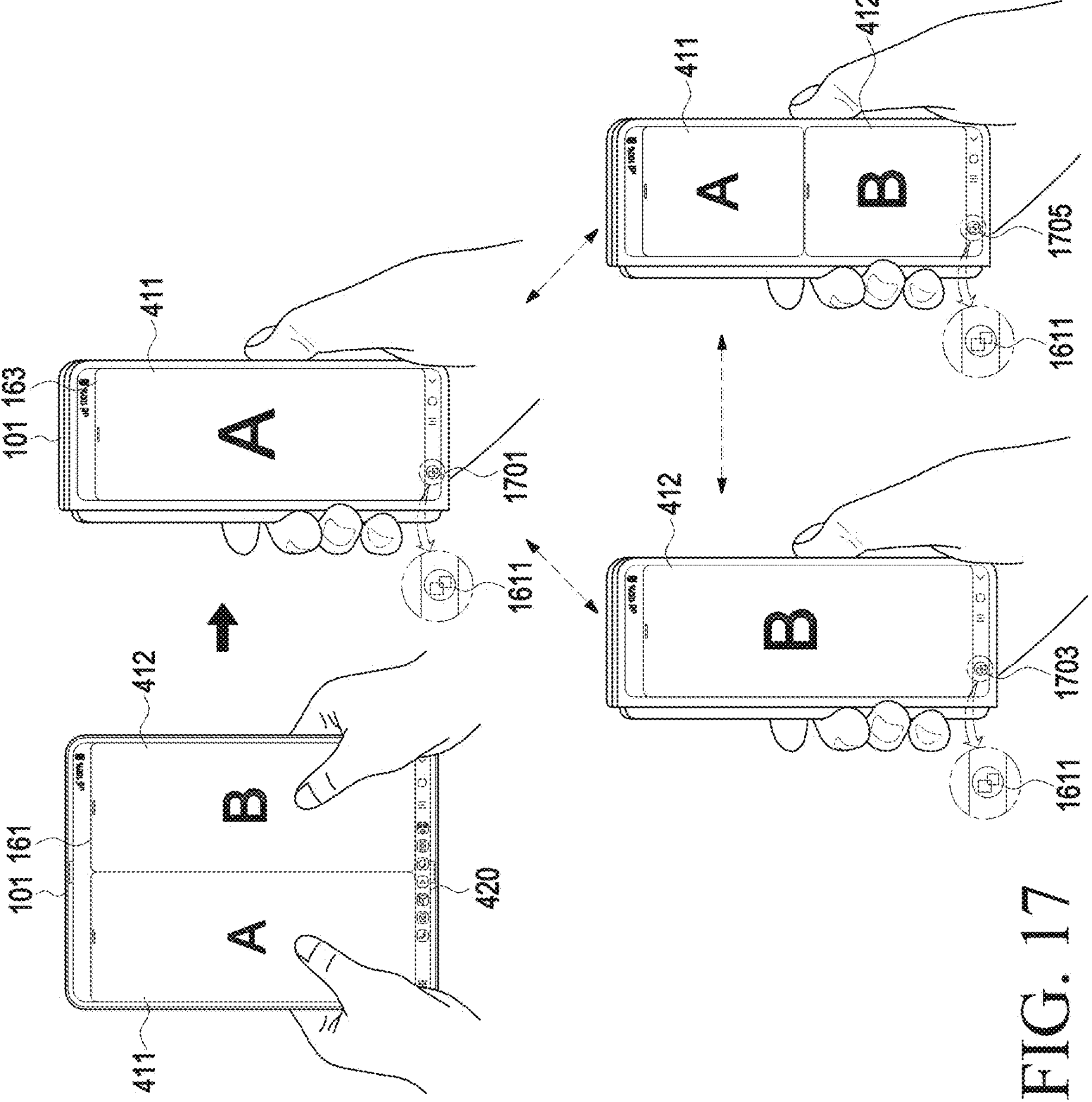
FIG. 17 is a view illustrating an example of displaying a screen when changing to a folded state in an electronic device according to an embodiment.

FIG. 17 is a view illustrating an example of displaying a screen when changing to a folded state in an electronic device according to an embodiment.

Referring to FIG. 17, an electronic device 101 (e.g., the electronic device 101 of FIGS. 1 to 6) according to an embodiment may display a first screen 411 of a first application A and a second screen 412 of a second application B in the unfolded state. When the electronic device 101 is changed from the unfolded state to the folded state, the electronic device 101 may display the first screen 411 of the first application and may display a second task bar 430 including a designated button 1611. According to an embodiment, when receiving the first input 1701 of the designated button 1611, the electronic device 101 may display the second screen 412 of the second application B corresponding to the second icon in place of the first screen 411 of the first application A. According to an embodiment, when receiving the second input 1703 of the designated button 1611, the electronic device 101 may divide the application display area of the second display 163, and may display the first screen 411 of the first application A and the second screen 412 of the second application B corresponding to the second icon in the divided areas, respectively. According to an embodiment, when receiving the third input 1705 of the designated button 1611, the electronic device 101 may stop displaying the second screen 412 on the second display 163, may merge the divided application display areas, and may enlarge the first screen 411 to display the enlarged first screen 411 on the entire application display area.

Figure 18:
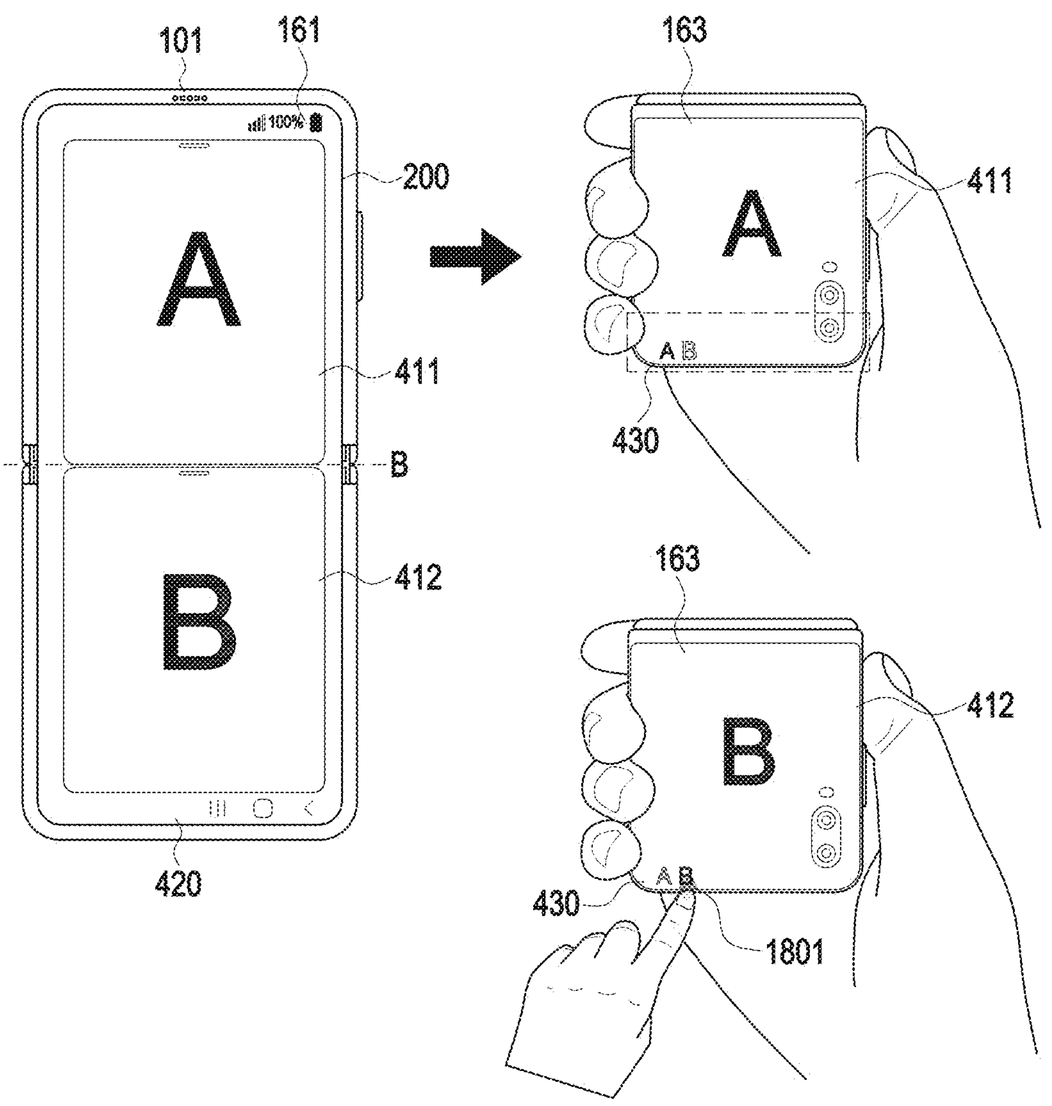
FIG. 18 is a view illustrating an example of displaying a screen when changing to a folded state in an electronic device according to an embodiment.

FIG. 18 is a view illustrating an example of displaying a screen when changing to a folded state in an electronic device according to an embodiment.

Referring to FIG. 18, in an electronic device 101 (e.g., the electronic device 101 of FIGS. 1 to 6) according to an embodiment may have a housing (e.g., the housing 200 of FIGS. 2A, 2B, 3A, and 3B) foldable about a folding axis B and, when the housing 200 is changed from the unfolded state to the folded state, display a first screen 411 of a first application A running on a second display 163 (e.g., a cover screen) is displayed, and when a selection input 1801 is received for a second icon B included in a second task bar 430, display, on the second screen 412 of the second application B in place of the first screen 411 of the first application A. The electronic device 101 that is foldable about the folding axis B illustrated in FIG. 18 may perform the operations described with reference to FIGS. 9 to 17 in the same manner.

According to an embodiment, a method for operating an electronic device (e.g., the electronic device 101 of FIGS. 1 to 6, and 9 to 18) may comprise displaying a first task bar (e.g., the first task bar 420 of FIGS. 4 to 6 and 9 to 18) and respective screens (e.g., the plurality of screens 411, 412, and 413 of FIGS. 4 to 6 and 9 to 18) corresponding to each of a plurality of running applications on a first display (e.g., the first display 161 of FIGS. 4 to 6 and 9 to 18) of the electronic device based on the electronic device being in an unfolded state.

According to an embodiment, the method may comprise generating at least one icon related to the plurality of applications based on the electronic device being changed from the unfolded state to a folded state.

According to an embodiment, the method may comprise displaying at least one screen among the plurality of screens and a second task bar (e.g., the second task bar 430 of FIGS. 4 to 6 and 9 to 18) including the generated at least one icon on a second display (e.g., the second display 163 of FIGS. 2A to 6 and 9 to 18) of the electronic device based on the electronic device being in the folded state.

According to an embodiment, wherein the housing of the electronic device includes a first housing structure (e.g., the first housing structure 210 of FIGS. 2A, 2B, 3A, and 3B), a second housing structure (e.g., the second housing structure 220 of FIGS. 2A, 2B, 3A, and 3B) and a hinge structure (e.g., the hinge structure 230 of FIGS. 2A, 2B, 3A, and 3B), wherein the first housing structure and second housing structure are connected at either side of, and rotatable about, the hinge structure, wherein the first display may be disposed on a first surface of the first housing structure and a first surface of the second housing structure so that a partial area of the housing is foldable about the hinge structure. According to an embodiment, the second display may be disposed on a second surface of the first housing structure or a second surface of the second housing structure.

According to an embodiment, the first task bar may include at least one of an icon of a favorite or frequently used application, an icon of a recently executed application, or a designated button. According to an embodiment, the second task bar may differ from the first task bar and include at least one icon generated by objects indicating the plurality of running applications displayed on the first display or a combination of the objects.

According to an embodiment, the second task bar may not overlap the at least one screen among the plurality of screens and may be displayed in a partial area of the second display.

According to an embodiment, the method may further comprise selecting the at least one application screen from among the plurality of application screens based on a priority, a recent execution, a designated area of the first display or a selection input.

According to an embodiment, the method may further comprise based on the electronic device being changed from the folded state to the unfolded state: turning off the second display and maintaining the execution of the plurality of applications and displaying the plurality of application screens on the first display.

According to an embodiment, the method may further comprise based on the electronic device being in the folded state: executing at least one another application based on a designated gesture input or a designated button input in the folded state, reducing a size of the at least one screen displayed on the second display based on execution of the at least one another application, and displaying a screen of the at least one another application on the second display not to overlap the at least one screen and the second task bar.

According to an embodiment, the method may further comprise generating another icon indicating the at least one another application and adding the other icon to the second task bar.

According to an embodiment, the method may further comprise based on the device being in the folded state: executing at least one another application based on a designated gesture input or a designated button input and stopping displaying the at least one screen on the second display and displaying a screen of the at least one another application on the second display.

According to an embodiment, the method may further comprise generating a pair icon corresponding to a combination of objects indicating two or more screens among the plurality of running applications on the first display, displaying the pair icon in the second task bar, and when the pair icon is selected, displaying the two or more application screens corresponding to the combination of the pair icon in divided areas, respectively, of the second display.

According to an embodiment, the method may further comprise displaying, on the second display, a screen of an application for an icon included in the second task bar by changing the at least one screen displayed on the second display to the screen of the application for the icon in response to a designated gesture input or a designated switching button input.

According to an embodiment, in non-transitory storage medium storing a program, the program may include instructions configured to, when executed by a processor of an electronic device (e.g., the electronic device 101 of FIGS. 1 to 6 and 9 to 18), cause the electronic device to perform displaying a first task bar and respective screens of a plurality of running applications on a first display of the electronic device based on the electronic device (101) being in an unfolded state, generating at least one icon related to the plurality of applications based on the electronic device (101) being changed from the unfolded state to a folded state, and displaying at least one screen among the plurality of screens and a second task bar including the generated at least one icon on a second display of the electronic device based on the electronic device (101) being in the folded state.

According to an embodiment of the disclosure, the electronic device may continuously display, in the folded state on the first display (e.g., the cover display), the plurality of screens of the plurality of running applications that used to be displayed on the first display (e.g., the main display) in the unfolded state of the housing. Other various effects may be provided directly or indirectly in the disclosure.

The embodiments disclosed herein are proposed for description and understanding of the disclosed technology and does not limit the scope of the disclosure. Accordingly, the scope of the disclosure should be interpreted as including all changes or various embodiments based on the technical spirit of the disclosure.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

display circuitry including a first display and a second display;

memory storing instructions; and at least one processor including a processing circuit, wherein the instructions, when executed by the at least one processor individually or collectively, cause the electronic device to:

based on the electronic device being in an unfolded state, display, on the first display, a first task bar and respective screens corresponding to each of a plurality of running applications, based on the electronic device being changed from the unfolded state to a folded state, maintain execution of the plurality of running applications, and generate a plurality of icons, each one of the plurality of icons corresponding to a respective one of the plurality of running applications, and based on the electronic device being in the folded state, display, on the second display, at least one screen among the plurality of screens and a second task bar including the generated plurality of icons, wherein the plurality of icons included in the second task bar are different from one or more icons included in the first task bar, and wherein the one or more icons included in the first task bar are pre-specified to execute an application.

2. The electronic device of claim 1, further comprising:

a housing configured to be foldable in a partial area, wherein the housing includes a first housing structure, a second housing structure and a hinge structure, wherein the first housing structure and second housing structure are connected at either side of, and rotatable about, the hinge structure, wherein the first display is disposed on a first surface of the first housing structure and a first surface of the second housing structure so that the partial area of the housing is foldable about the hinge structure, and wherein the second display is disposed on a second surface of the first housing structure or a second surface of the second housing structure.

3. The electronic device of claim 1, wherein the first task bar further includes a designated button, wherein the one or more icons included in the first task bar includes at least one of an icon of a favorite or frequently used application, or an icon of a recently executed application, wherein the second task bar differs from the first task bar and includes at least one icon generated by objects indicating the plurality of running applications displayed on the first display or a combination of the objects, and wherein the second task bar does not overlap the at least one screen among the plurality of screens and is displayed in a partial area of the second display.

4. The electronic device of claim 1, wherein the instructions, when executed by the at least one processor individually or collectively, further cause the electronic device to select the at least one screen from among the plurality of screens based on:

a priority, a designated area of the first display, or a received selection input.

5. The electronic device of claim 1, based on the electronic device changing from the folded state to the unfolded state:

turn off the second display; and maintain the execution of the plurality of running applications and display, on the first display, the respective screens corresponding to each of the plurality of running applications.

6. The electronic device of claim 1, wherein the instructions, when executed by the at least one processor individually or collectively, further cause the electronic device to, based on the electronic device being in the folded state:

execute at least one other application based on a designated gesture input or a designated button input;

reduce a size of the at least one screen displayed on the second display based on execution of the at least one other application;

display a screen of the at least one other application on the second display so as not to overlap the at least one screen and the second task bar; and add an icon indicating the at least one other application to the second task bar.

7. The electronic device of claim 1, wherein the instructions, when executed by the at least one processor individually or collectively, further cause the electronic device to, based on the electronic device being in the folded state:

execute at least one other application based on a designated gesture input or a designated button input; and stop displaying the at least one screen on the second display and display a screen of the at least one other application on the second display.

8. The electronic device of claim 1, wherein the instructions, when executed by the at least one processor individually or collectively, further cause the electronic device to:

generate a pair icon corresponding to a combination of objects indicating two or more screens among the plurality of running applications on the first display;

display the pair icon in the second task bar; and when the pair icon is selected, display the two or more screens corresponding to the combination of the pair icon in divided areas, respectively, of the second display.

9. The electronic device of claim 1, wherein the instructions, when executed by the at least one processor individually or collectively, further cause the electronic device to:

display, on the second display, a screen of an application for an icon included in the second task bar by changing the at least one screen displayed on the second display to the screen of the application for the icon in response to a designated gesture input or a designated switching button input.

10. A method for operating an electronic device, the method comprising:

displaying a first task bar and respective screens corresponding to each of a plurality of running applications on a first display of the electronic device based on the electronic device being in an unfolded state;

based on the electronic device being changed from the unfolded state to a folded state, maintaining execution of the plurality of running applications, and generating a plurality of icons, each one of the plurality of icons corresponding to a respective one of the plurality of running applications; and based on the electronic device being in the folded state, displaying at least one screen among the plurality of screens and a second task bar including the generated plurality of icons on a second display of the electronic device, wherein the plurality of icons included in the second task bar are different from one or more icons included in the first task bar, and wherein the one or more icons included in the first task bar are pre-specified to execute an application.

11. The method of claim 10, wherein a housing of the electronic device includes a first housing structure, a second housing structure and a hinge structure, wherein the first housing structure and second housing structure are connected at either side of, and rotatable about, the hinge structure, wherein the first display is disposed on a first surface of the first housing structure and a first surface of the second housing structure so that a partial area of the housing is foldable about the hinge structure, and wherein the second display is disposed on a second surface of the first housing structure or a second surface of the second housing structure.

12. The method of claim 10, wherein the first task bar further includes a designated button, wherein the one or more icons included in the first task bar includes at least one of an icon of a favorite or frequently used application, or an icon of a recently executed application, wherein the second task bar differs from the first task bar and includes at least one icon generated by objects indicating the plurality of running applications displayed on the first display or a combination of the objects, and wherein the second task bar does not overlap the at least one screen among the plurality of screens and is displayed in a partial area of the second display.

13. The method of claim 10, further comprising selecting the at least one screen from among the plurality of screens based on:

a priority, an area of the first display having been designated, or a selection input having been received.

14. The method of claim 10, based on the electronic device being changed from the folded state to the unfolded state:

turning off the second display; and maintaining the execution of the plurality of running applications and displaying, on the first display, the respective screens corresponding to each of the plurality of running applications.

15. The method of claim 10, further comprising, based on the electronic device being in the folded state:

executing at least one other application based on a designated gesture input or a designated button input;

reducing a size of the at least one screen displayed on the second display based on execution of the at least one other application; and displaying a screen of the at least one other application on the second display not to overlap the at least one screen and the second task bar.

16. The method of claim 15, further comprising:

generating another icon indicating the at least one other application; and adding the other icon to the second task bar.

17. The method of claim 16, further comprising:

based on the electronic device being in the folded state:

executing at least one other application based on a designated gesture input or a designated button input; and stopping displaying the at least one screen on the second display and displaying a screen of the at least one other application on the second display.

18. The method of claim 10, further comprising:

generating a pair icon corresponding to a combination of objects indicating two or more screens among the plurality of running applications on the first display;

displaying the pair icon in the second task bar; and when the pair icon is selected, displaying the two or more screens corresponding to the combination of the pair icon in divided areas, respectively, of the second display.

19. The method of claim 10, further comprising:

displaying, on the second display, a screen of an application for an icon included in the second task bar by changing the at least one screen displayed on the second display to the screen of the application for the icon in response to a designated gesture input or a designated switching button input.

20. The method of claim 10, wherein icons of the generated plurality of icons, corresponding to an application having a displayed screen, are displayed differently than icons of the generated plurality of icons corresponding to an application running in the background.

21. A non-transitory storage medium storing a program including instructions configured to, when executed by a processor of an electronic device, cause the electronic device to perform:

displaying a first task bar and respective screens of a plurality of running applications on a first display of the electronic device based on the electronic device being in an unfolded state;

based on the electronic device being changed from the unfolded state to a folded state, maintaining execution of the plurality of running applications, and generating a plurality of icons, each one of the plurality of icons corresponding to a respective one of the plurality of running applications for continuous use of the plurality of screens; and based on the electronic device being in the folded state, displaying at least one screen among the plurality of screens and a second task bar including the generated plurality of icons on a second display of the electronic device, wherein the plurality of icons included in the second task bar are different from one or more icons included in the first task bar, and wherein the one or more icons included in the first task bar are pre-specified to execute an application.

* * * * *